(12) United States Patent
Sjoquist et al.

(10) Patent No.: US 7,997,647 B2
(45) Date of Patent: Aug. 16, 2011

(54) SAFETY SEAT

(76) Inventors: Dan Sjoquist, Mesa, AZ (US); Kurt Hinkle, Queen Creek, AZ (US)

( * ) Notice: Subject to any disclaimer, the term of this patent is extended or adjusted under 35 U.S.C. 154(b) by 166 days.

(21) Appl. No.: 12/053,545

(22) Filed: Mar. 21, 2008

(65) Prior Publication Data
US 2009/0127903 A1 May 21, 2009

Related U.S. Application Data

(60) Provisional application No. 60/896,810, filed on Mar. 23, 2007, provisional application No. 60/973,766, filed on Sep. 20, 2007.

(51) Int. Cl.
A47C 15/00 (2006.01)
(52) U.S. Cl. .......................... 297/238; 297/232; 297/236
(58) Field of Classification Search .................. 297/232, 297/234, 236, 237, 238, 344.21–344.26; 296/63.03
See application file for complete search history.

(56) References Cited

U.S. PATENT DOCUMENTS

| | | | | |
|---|---|---|---|---|
| 4,756,573 A * | 7/1988 | Simin et al. | ................. | 297/250.1 |
| 4,768,827 A * | 9/1988 | Musgrove | ..................... | 297/236 |
| 4,904,003 A * | 2/1990 | Yamazaki et al. | ............. | 292/126 |
| 4,936,627 A * | 6/1990 | Guim | ............................ | 297/238 |
| 5,035,465 A * | 7/1991 | Hanai et al. | .................... | 297/238 |
| 5,121,964 A * | 6/1992 | Fourrey et al. | ................. | 297/237 |
| 5,280,995 A * | 1/1994 | Elton | .............................. | 297/238 |
| 5,380,060 A * | 1/1995 | Sponsler et al. | ............... | 297/238 |
| 5,383,707 A * | 1/1995 | Osenkowski et al. | ......... | 297/238 |
| 5,409,293 A * | 4/1995 | Nagasaka | ...................... | 297/236 |
| 5,476,305 A * | 12/1995 | Corkins et al. | ................ | 297/238 |
| 5,524,962 A * | 6/1996 | Fulgenzi et al. | ............... | 297/237 |
| 5,588,700 A * | 12/1996 | Homier | ......................... | 297/238 |
| 5,603,550 A * | 2/1997 | Holdampf et al. | ............ | 297/238 |
| 5,788,326 A * | 8/1998 | Kawade et al. | ............... | 297/236 |
| 5,806,926 A * | 9/1998 | Parsons | ......................... | 297/238 |
| 6,048,027 A * | 4/2000 | Peck et al. | ..................... | 297/238 |
| 6,220,665 B1 * | 4/2001 | Dingel et al. | ................. | 297/326 |
| 6,386,629 B1 * | 5/2002 | Severinski et al. | ......... | 297/188.1 |
| 6,971,718 B2 * | 12/2005 | Haglund | ....................... | 297/236 |
| 7,159,941 B2 * | 1/2007 | Thomas | ......................... | 297/255 |
| 7,261,381 B2 * | 8/2007 | Tsai | ................................ | 297/488 |
| 7,458,635 B2 * | 12/2008 | Mendis et al. | ................ | 297/238 |
| 7,517,016 B1 * | 4/2009 | West et al. | ..................... | 297/236 |
| 7,520,554 B2 * | 4/2009 | Brown et al. | ............... | 296/65.01 |

* cited by examiner

*Primary Examiner* — Laurie K Cranmer
(74) *Attorney, Agent, or Firm* — Schmeiser, Olsen and Watts LLP

(57) ABSTRACT

A chair includes a chair base and seat frame extending upwardly from the chair base. The chair includes an interlock assembly, and an infant chair repeatably moveable between stowed and deployed positions with the chair base. The interlock assembly restricts and allows the ability of the infant chair to move between the stowed and deployed positions. The interlock assembly restricts the ability of the chair base to rotate in response to the infant chair being in the deployed position.

16 Claims, 15 Drawing Sheets

FIG. 4
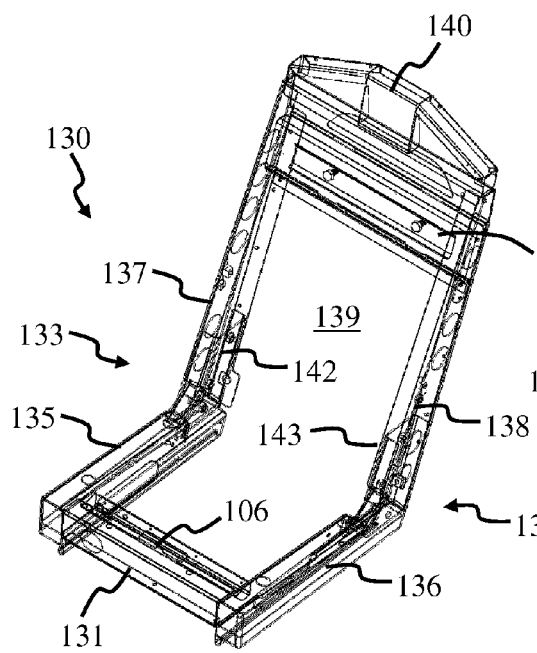
FIG. 5a
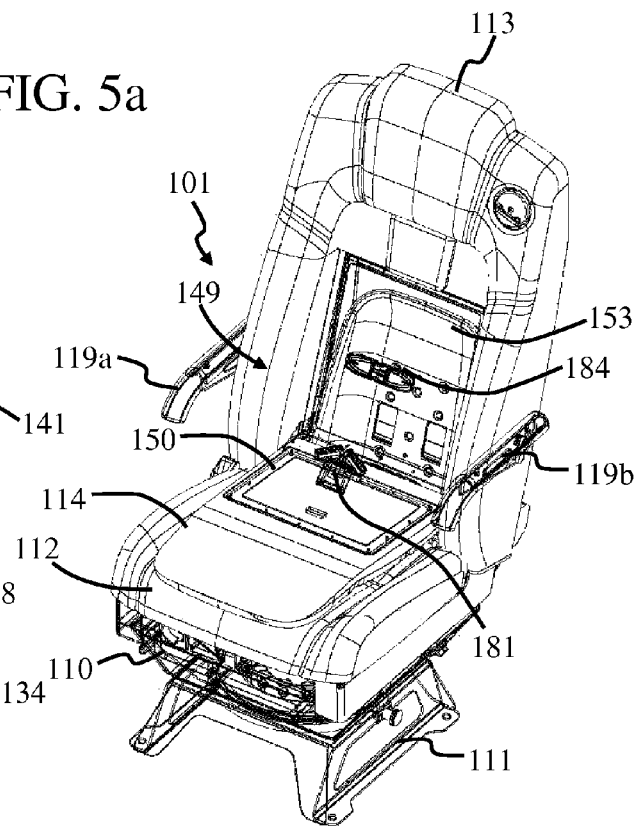
FIG. 5b
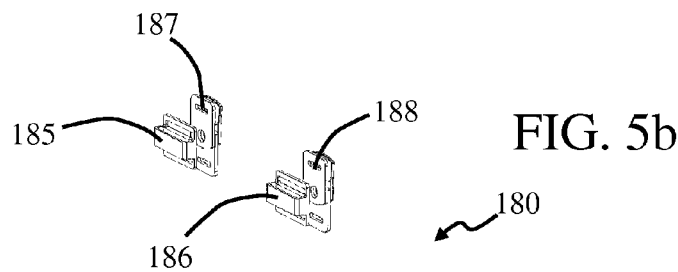

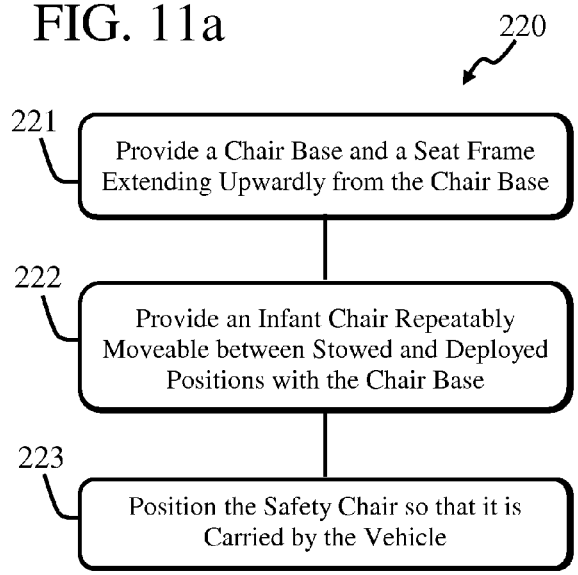
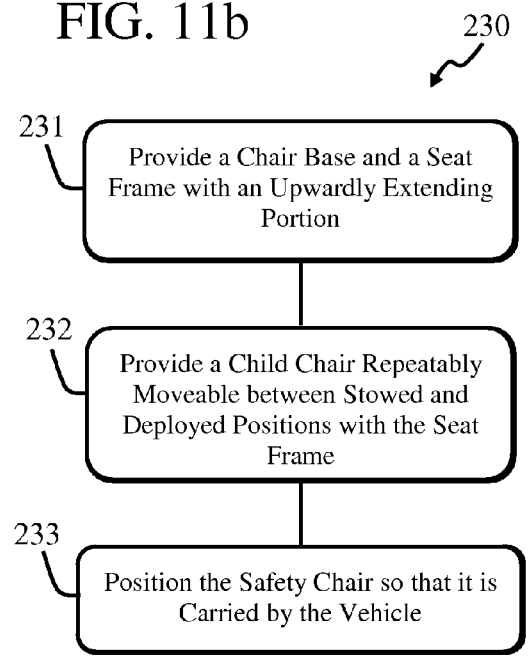
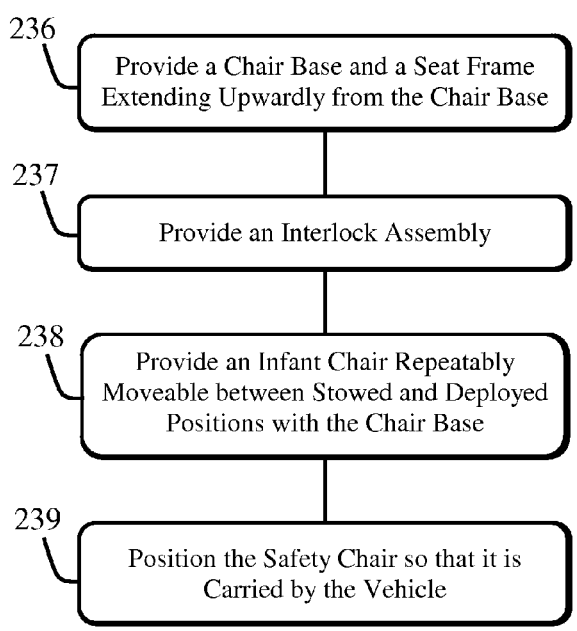

SAFETY SEAT

CROSS-REFERENCE TO RELATED APPLICATIONS

This application claims priority to U.S. Provisional Application Nos. 60/896,810 and 60/973,766, which were filed on Mar. 23, 2007 and Sep. 20, 2007, respectively, the contents of both of which are incorporated herein by reference.

BACKGROUND OF THE INVENTION

1. Field of the Invention

This invention relates to a safety seat for a vehicle.

2. Description of the Related Art

It is often necessary to transport people of many different age groups with a vehicle. For example, it is sometimes necessary to transport a mother and her infant or child to a hospital using an emergency response vehicle, such as an ambulance. The mother can be positioned on a stretcher, but oftentimes there is no safe position for carrying the infant. In these situations, the infant is often carried by the mother or an emergency medical technician who is sitting on a paramedic ambulance chair. The paramedic ambulance chair is typically positioned in the back of the ambulance. The paramedic ambulance chair is positioned so that the paramedic sitting on it can monitor the patient, as well as operate the equipment included with the ambulance.

It is well-known that it is dangerous for a person to carry an infant while sitting in a moving vehicle. In fact, it is against the law to do so in most jurisdictions in the United States. However, emergency response vehicles are often exempt from such restrictions. The infant can be seriously injured if the emergency response vehicle is involved in an accident while the infant is being carried in this manner. Accordingly, there is a need to provide a way to transport an infant in a safer manner.

SUMMARY OF THE INVENTION

The invention provides a chair which includes a chair base and seat frame extending upwardly from the chair base. The chair includes an infant chair repeatably moveable between stowed and deployed positions with the chair base.

In some embodiments, the infant chair moves through an opening of the seat frame when moving between the stowed and deployed positions. The infant chair is repeatably moveable between the stowed and deployed positions with the chair base when the chair base is in a predetermined position. The infant chair is restricted from moving between the stowed and deployed positions in response to the chair base not being in a predetermined position.

In some embodiments, the chair includes a child chair repeatably moveable between stowed and deployed positions with the seat frame. The child chair is rotatably coupled with the seat frame. The child chair moves through an opening of the seat frame when moving between the stowed and deployed positions.

The invention provides a chair which includes a chair base and a seat frame with an upwardly extending portion. The chair includes a child chair repeatably moveable between stowed and deployed positions with the seat frame. The child chair moves through an opening of the seat frame when moving between the stowed and deployed positions. In some embodiments, the chair includes a flip bracket which rotatably couples the child chair with the seat frame.

In some embodiments, the chair includes an infant chair repeatably moveable between stowed and deployed positions. The infant chair moves through an opening of the seat frame when moving between the stowed and deployed positions. The infant chair is repeatably moveable between the stowed and deployed positions when the chair base is directed in a predetermined direction. The infant chair is restricted from moving between the stowed and deployed positions in response to the chair base not being directed in the predetermined direction.

The invention provides a chair which includes a chair base and a seat frame extending upwardly from the chair base. The chair includes an interlock assembly and an infant chair repeatably moveable between stowed and deployed positions. The interlock assembly restricts and allows the ability of the infant chair to move between the stowed and deployed positions. The interlock assembly restricts the ability of the chair base to rotate in response to the infant chair being in the deployed position. The interlock assembly allows the infant chair to move between the stowed and deployed positions with the chair base when the chair base is in a predetermined position.

In some embodiments, the chair includes a child chair repeatably moveable between stowed and deployed positions. The child chair includes a child seat and child seat back rotatably coupled with the seat frame. In some embodiments, the chair includes a flip bracket which rotatably couples the child seat and child seat back with the seat frame.

In some embodiments, the chair includes a seat pan cushion and moveable seat back cushion rotatably coupled together. The chair can include a flip bracket which rotatably couples the seat pan cushion and moveable seat back cushion together. In these embodiments, the chair can include a child chair rotatably coupled with the flip bracket.

Further features and advantages of the invention will be apparent to those skilled in the art from the following detailed description, taken together with the accompanying drawings.

BRIEF DESCRIPTION OF THE DRAWINGS

FIG. 4 is a perspective view of a seat frame of the reconfigurable safety chair of FIG. 1.

FIG. 5a is a perspective view of the reconfigurable safety chair of FIG. 1 configured to carry a child.

FIG. 5b is a perspective view of a child harness used to hold a child to the reconfigurable safety chair as shown in FIG. 5a.

FIGS. 11a, 11b and 11c are flow diagrams of methods, in accordance with the invention, of installing a reconfigurable safety chair.

DETAILED DESCRIPTION OF THE INVENTION

Figure 1:
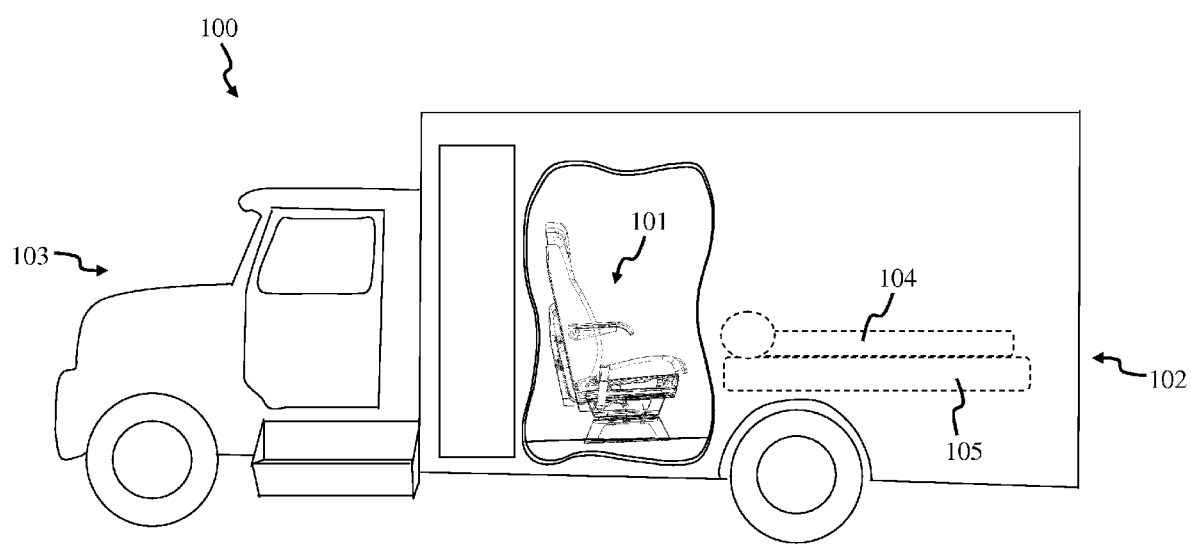
FIG. 1 is a side view of an emergency vehicle which carries a reconfigurable safety chair, in accordance with the invention.

FIG. 1 is a side view of an emergency response vehicle 100 which carries a reconfigurable safety chair 101, in accordance with the invention. Safety chair 101 can be of many different types, but here it embodied as a "high back chair". Emergency response vehicle 100 can be of many different types, but here it is embodied as an ambulance. It should be noted that emergency response vehicle 100 can be replaced with many different types of vehicles. For example, in some embodiments, the vehicle which carries reconfigurable safety chair 101 is a vehicle that can fly, such as a helicopter and airplane. In other embodiments, the vehicle which carries reconfigurable safety chair 101 is a tracked vehicle, such as a military troop transport carrier. In some embodiments, the vehicle which carries reconfigurable safety chair 101 is floatable, such as a boat and amphibious vehicle. In general, safety chair 101 is carried in a vehicle in which it is desired to carry an adult, child or infant.

Safety chair 101 is typically capable of rotating so it can face towards rear 102 and front 103 of vehicle 100, as well as directions in between. Reconfigurable safety chair 101 is often positioned facing rear 102 so that a paramedic (not shown) can sit in chair 101 and monitor a patient 104 being carried by a stretcher 105. Reconfigurable safety chair 101 is often positioned facing front 103 when vehicle 100 is not carrying a patient.

In accordance with the invention, reconfigurable safety chair 101 is repeatably moveable between conditions in which it can carry an adult, child and infant. For example, if safety chair 101 is currently configured to carry an adult, it can be reconfigured to carry a child and infant. Further, if safety chair 101 is currently configured to carry a child, it can be reconfigured to carry an adult and infant. If safety chair 101 is currently configured to carry an infant, it can be reconfigured to carry an adult and child. In this way, chair 101 operates as a reconfigurable safety chair which can carry an adult, child or infant.

Figure 2:
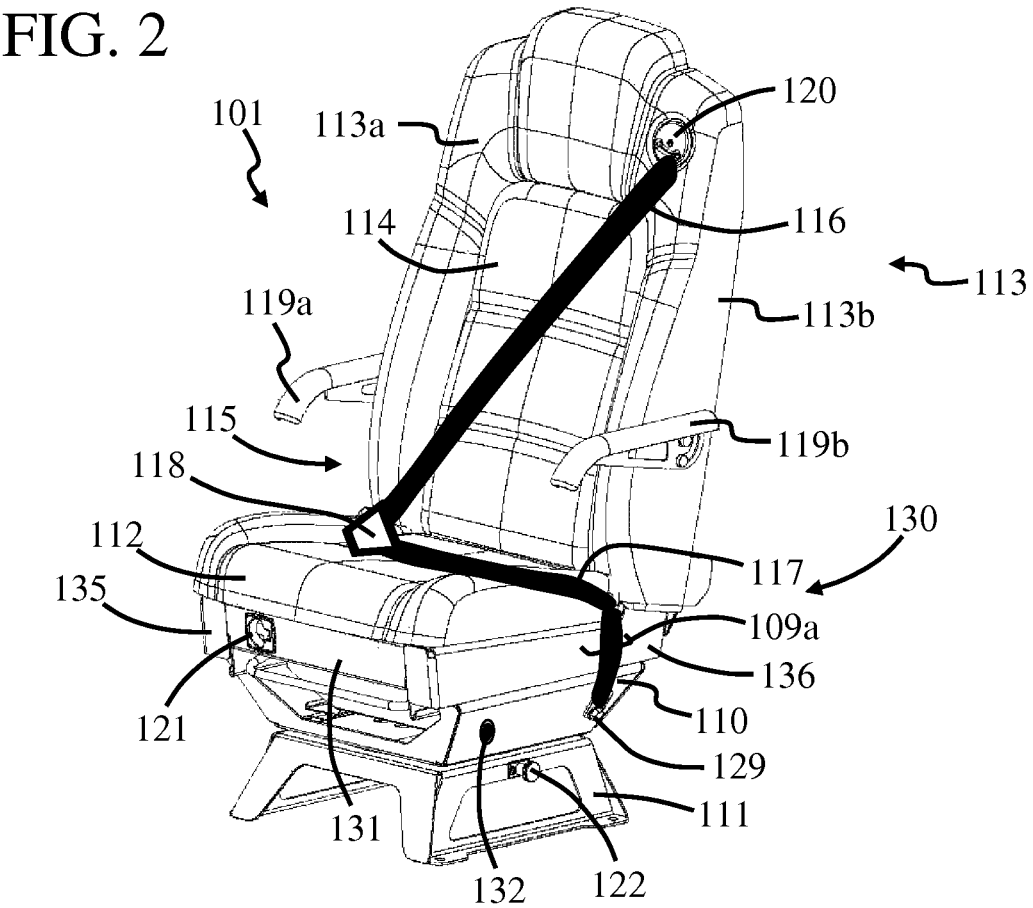
FIG. 2 is a perspective view of the reconfigurable safety chair of FIG. 1 configured to carry an adult.

In accordance with the invention, safety chair 101 includes a child chair (FIG. 5a) and an infant chair (FIG. 6a) which are each repeatably moveable between stowed and deployed positions. Safety chair 101 is configured to carry an infant when the infant chair is deployed. Further, safety chair 101 is configured to carry a child when the child chair is deployed and the infant chair is stowed. Safety chair 101 is configured to carry an adult when the infant and child chairs are stowed, as shown in FIG. 2. In this way, reconfigurable safety chair 101 is repeatably reconfigurable to operate as an adult chair, child chair and infant chair.

The child chair is shaped and dimensioned to carry a child and the infant chair is shaped and dimensioned to carry an infant. The weight of the child and infant can be within many different weight ranges. For example, an infant generally weighs less than about twenty-five pounds and a child generally weighs between about twenty-five pounds to about one-hundred pounds. It should be noted, however, that children and infants can have weights outside of these weight ranges.

FIG. 2 is a perspective view of reconfigurable safety chair 101 configured to carry an adult. In this embodiment, safety chair 101 includes a chair stand 111 which carries a chair base 110. Chair stand 111 and chair base 110 will be discussed in more detail with FIGS. 3a and 3b. Chair base 110 carries a seat frame 130, which extends upwardly from chair base 110. Seat frame 130 will be discussed in more detail with FIG. 4.

In this embodiment, safety chair 101 includes a seat pan cushion 112 carried by chair base 110 and seat frame 130, and an adult seat back 113 and moveable seat back cushion 114. Adult seat back 113 and moveable seat back cushion 114 are also carried by seat frame 130 and will be discussed in more detail with FIGS. 5c-5f. Adult seat back 113 and moveable seat back cushion 114 extend upwardly from chair base 110 and seat pan cushion 112. Adult seat back 113 can include many different components, but it generally includes an adult seat back cushion 113a and adult seat back housing 113b, wherein housing 113b includes an opening for receiving an infant chair and child chair. Safety chair 101 includes opposed armrests 119a and 119b positioned so that the adult sitting on seat pan cushion 112 can rest his or her arms on them.

In this embodiment, chair 101 includes a seat belt 115 for holding an adult to it and for holding him or her in a sitting position. In particular, seat belt 115 holds the adult to seat pan cushion 112, as well as adult seat back 113 and moveable seat back cushion 114. Seat belt 115 can be of many different types. In this embodiment, seat belt 115 includes a torso belt 116 and waist belt 117, wherein torso belt 116 is coupled to a belt bezel 120 at one end and waist belt 117 is coupled to a belt anchor 129. In this embodiment, belt bezel 120 is carried by seat back cushion 113 and belt anchor 129 is carried by chair base 110. Seat belt 115 includes a clasp 118 coupled to torso belt 116 and waist belt 117. Safety chair 101 can include a bar 109a for holding waist belt 117 to seat frame 130. Bar 109a holds waist belt 117 to restrict its movement.

Safety chair 101 includes a retractable spring plunger 122 which can be pulled outwardly to allow chair base 110 to rotate relative to chair stand 111. In this way, chair 101 can be rotated between facing rear 102 and front 103 (FIG. 1). Safety chair 101 includes a handle 121 which can be pulled to allow seat pan cushion 112 and moveable seat back cushion 114 to be removed from base 110 and adult seat back 113. Handle 121 holds a bar 108, as shown in FIG. 5f, coupled to seat pan cushion 112.

Figure 3A:
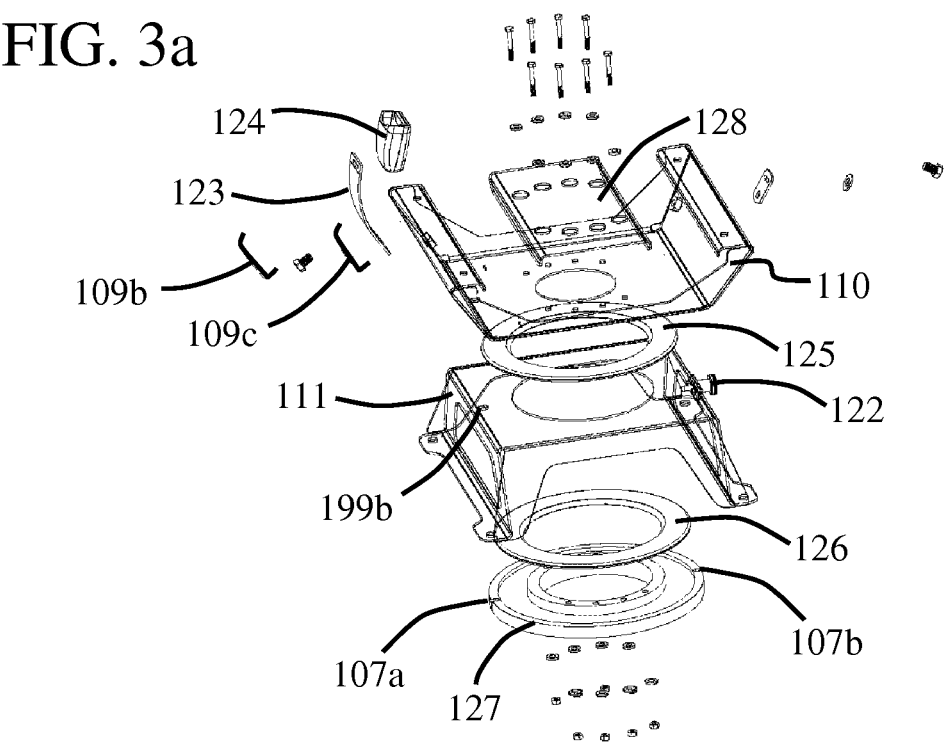
FIGS. 3a and 3b are exploded and unexploded perspective views, respectively, of a chair base and chair stand of the reconfigurable safety chair of FIG. 1.
Figure 3B:
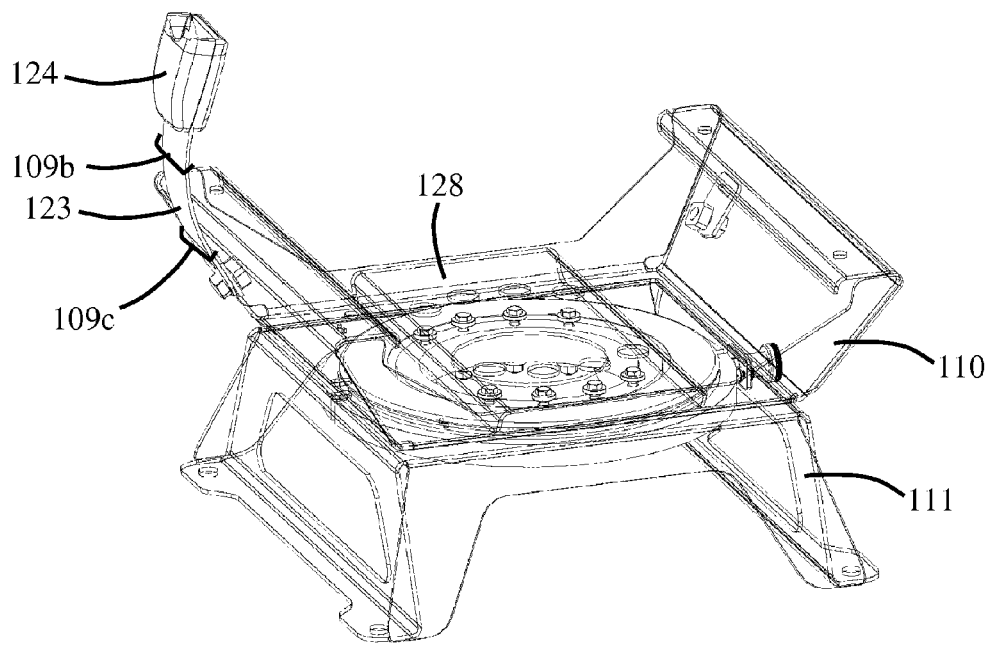

FIGS. 3a and 3b are exploded and unexploded perspective views, respectively, of chair base 110 and stand 111. In this embodiment, chair base 110 and stand 111 are roatatable relative to each other. Chair base 110 and stand 111 can be rotatably relative to each other in many different ways. In this embodiment, an upper ring 125 is positioned between chair base 110 and stand 111 and a lower ring 126 is positioned so that chair stand 111 is between it and upper ring 125. Lower ring 126 is held to stand 111 with a retaining ring 127 and retaining ring 127 is held to chair base 110 with a stiffening bracket 128. Retaining ring 127 and stiffening bracket 128 can be held together in many different ways. In this embodiment, retaining ring 127 and stiffening bracket 128 are held together with bolts which extend through them and chair base 110.

Retaining ring 127 includes opposed slots 107a and 107b positioned to receive retractable spring plunger 122. When retractable spring plunger 122 is received by one of slots 107a and 107b, retaining ring 127 is restricted from rotating relative to chair stand 111. When retaining ring 127 is restricted from rotating relative to chair stand 111, chair base 110 is also restricted to rotating relative to chair stand 111 because chair base and retaining ring 127 are coupled together as described above. In this embodiment, when retractable spring plunger 122 is received by slot 107b, safety chair 101 is facing rear 102 of vehicle 100, so that rear 102 corresponds to a predetermined direction. When retractable spring plunger 122 is received by slot 107b, chair base 110 is in a first predetermined position. Further, when retractable spring plunger 122 is received by slot 107a, safety chair 101 is facing front 103 of vehicle 100, so that front 103 corresponds to a predetermined direction. When retractable spring plunger 122 is received by slot 107a, chair base 110 is in a second predetermined position. In this way, retractable spring plunger 122 and slots 107a and 107b can be used to lock safety chair 101 so it faces a predetermined direction. Further, retractable spring plunger 122 and slots 107a and 107b can be used to position chair base 110 in predetermined positions.

In this embodiment, chair base 110 and chair stand 111 include openings 199a and 199b extending therethrough. Openings 199a and 199b rotate relative to each other in response to rotating chair base 110 relative to chair stand 111. Openings 199a and 199b are adjacent to each other when retractable spring plunger 122 can be received by slot 107b. Further, openings 199a and 199b are aligned with each other when retractable spring plunger 122 can be received by slot 107b. Openings 199a and 199b face each other when retractable spring plunger 122 can be received by slot 107b. A rotation restrictor can be extended through openings 199a and 199b when retractable spring plunger 122 can be received by slot 107b. When the restrictor is extended through openings 199a and 199b, chair base 110 is restricted from rotating relative to chair stand 111. When a restrictor is not extended through openings 199a and 199b, chair base 110 is not restricted from rotating relative to chair stand 111 if retractable spring plunger 122 is not being received by slot 107b. More information regarding a rotation restrictor is provided below with FIGS. 7a and 7b.

In this embodiment, a buckle post 123 is attached to chair base 110 so it extends upwardly therefrom. A buckle 124 is carried by buckle post 123 and can be coupled with clasp 118 (FIG. 2). Safety chair 101 can include bar 109b and 109c for holding buckle post 123 to seat frame 130. Bars 109b and 109c hold buckle post 123 to restrict its movement.

FIG. 4 is a perspective view of seat frame 130, in accordance with the invention. In this embodiment, seat frame 130 includes right and left frame members 133 and 134. Right frame member 133 includes a lower frame member 135 and an upper frame member 137 extending upwardly therefrom. Lower frame member 135 and upper frame member 137 are coupled together with a right frame brace 142. Further, left frame member 134 includes a lower frame member 136 and an upper frame member 138 extending upwardly therefrom. Lower frame member 136 and upper frame member 138 are coupled together with a left frame brace 143. It should be noted that upper frame members 137 and 138 are portions of seat frame 130 which extend upwardly from chair base 110.

In this embodiment, seat frame 130 includes a front cross member 131 which extends between lower frame members 135 and 136. Seat frame 130 includes an adult headrest 140 and child head rest 141 which extend between upper frame members 137 and 138. Further, seat frame 130 includes a latch 106 carried by front cross member 131. Latch 106 is for receiving a bar 108 (FIG. 5f) attached to the bottom of seat pan cushion 112. When bar 108 is received by latch 106, seat pan cushion 112 is held to chair base 110 and seat frame 130. Latch 106 releases bar 108 in response to pulling handle 121. In this way, handle 121 can be pulled to allow seat pan cushion 112 and moveable seat back cushion 114 to be removed from base 110 and adult seat back 113.

In accordance with the invention, seat frame 130 includes an opening 139 through which the infant seat and child seat can move, as will be discussed in more detail below. In this embodiment, opening 139 is positioned between lower frame members 135 and 136, as well as between upper frame members 137 and 138. Opening 139 is shaped and dimensioned to allow an infant chair and child chair to move therethrough.

Figure 5C:
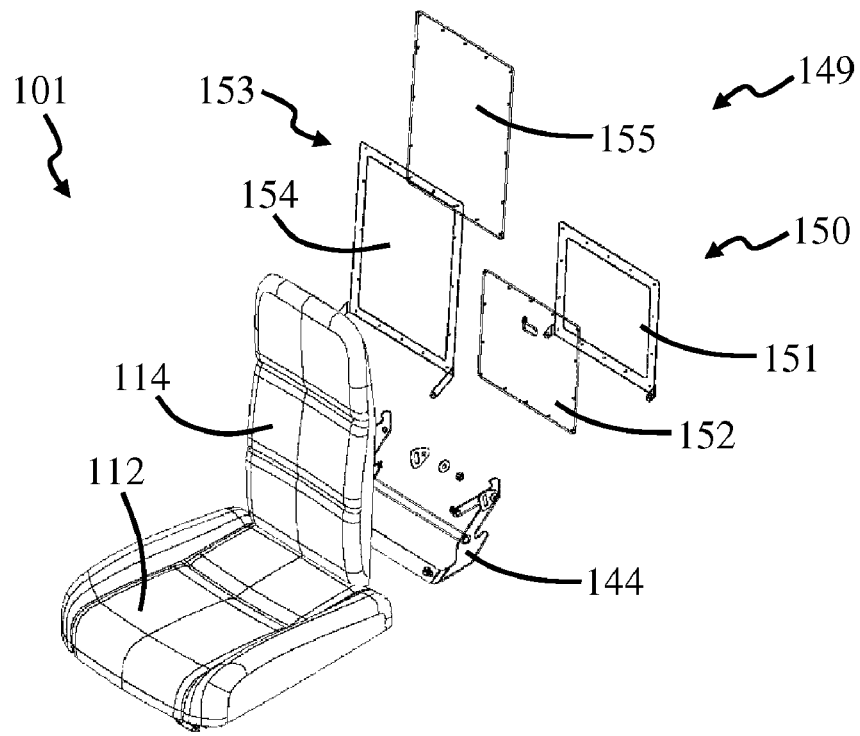
FIG. 5c is an exploded perspective view of the reconfigurable safety chair of FIG. 1.

FIG. 5a is a perspective view of reconfigurable safety chair 101 configured to carry a child. In this embodiment, moveable seat back cushion 114 has been moved towards seat pan cushion 112 and away from seat back cushion 113. Moveable seat back cushion 114 is in stowed and deployed positions when it is positioned proximate to seat back cushion 113 and seat pan cushion 112, respectively. It should be noted that moveable seat back cushion 114 is repeatably moveable between the stowed and deployed positions. Moveable seat back cushion 114 can be repeatably moveable between the stowed and deployed positions in many different ways, one of which will be discussed in more detail below with FIGS. 5c, 5d, 5e and 5f.

In accordance with the invention, safety chair 101 includes a child chair assembly 149 which operates as a child chair for carrying a child. Child chair assembly 149 is repeatably moveable between stowed and deployed positions. In the stowed position, child chair assembly 149 is enclosed by adult seat back 113 and moveable seat back cushion 114. In the deployed position, child chair assembly 149 is not enclosed by adult seat back 113 and moveable seat back cushion 114. When child chair assembly 149 moves between the stowed and deployed positions, it moves through the opening of adult seat back housing 113b.

Child chair assembly 149 can have many different configurations. In this embodiment, child chair assembly 149 includes a child seat 150 and child seat back 153. In FIG. 5a, child seat 150 has been moved towards moveable seat back cushion 114 and seat pan cushion 112, and away from child seat back 153. Child seat 150 is in stowed and deployed positions when it is positioned towards and away from adult seat back 113, respectively. It should be noted that child seat 150 is repeatably moveable between the stowed and deployed positions. Child seat 150 can be repeatably moveable between the stowed and deployed positions in many different ways, one of which will be discussed in more detail below with FIGS. 5c, 5d, 5e and 5f.

In FIG. 5a, child seat back 153 is positioned away from seat pan cushion 112, child seat 150 and moveable seat back cushion 114, and towards seat back cushion 113. Child seat back 153 is in the stowed position when it is positioned proximate to seat back cushion 113 and child seat back 153 is in the deployed position when it is positioned away from seat back cushion 113. It should be noted that child seat back 153 is repeatably moveable between the stowed and deployed positions. Child seat back 153 can be repeatably moveable between the stowed and deployed positions in many different ways, one of which will be discussed in more detail below with FIGS. 5c, 5d, 5e and 5f.

In operation, a child sits on child seat 150 when child seat 150 is deployed. Further, the child's back rests against child seat back 153 when child seat back 153 is stowed. In this way, reconfigurable safety chair 101 carries a child. When it is desired to seat an adult on safety chair 101, child seat 150 and child seat back 153 are both stowed, as shown in FIG. 2. It should be noted that reconfigurable safety chair 101 typically includes a child harness to safely hold the child, one of which will be discussed in more detail presently.

FIG. 5b is a perspective view of one embodiment of a child harness 180, which can be used to hold a child to reconfigurable safety chair 101. In this embodiment, child harness 180 includes a child crotch buckle 181 attached to child torso buckles 182 and 183. Child crotch buckle 181 is positioned so that it extends between the legs of a child sitting on child seat 150. Further, child harness 180 includes a child chest clip 184 positioned so that it is proximate to the midsection of a child sitting on child seat 150.

In this embodiment, child harness 180 includes torso strap anchors 187 and 188 positioned so that they are proximate to the right and left shoulders, respectively, of a child sitting on child seat 150. Torso strap clips 185 and 186 are coupled to torso strap anchors 187 and 188, respectively. Torso strap anchors 187 and 188 anchor torso strap clips 185 and 186, respectively, to child seat back 153. One or more torso straps (not shown) extend between child torso buckles 182 and 183, child chest clip 184, as well as torso strap clips 185 and 186. The torso strap(s) hold a child sitting on child seat 150 to safety chair 101. It should be noted that torso strap clips 185 and 186 are repeatably moveable relative to torso strap anchors 187 and 188, respectively, so that child harness 180 can accommodate children of different heights.

Figure 5D:
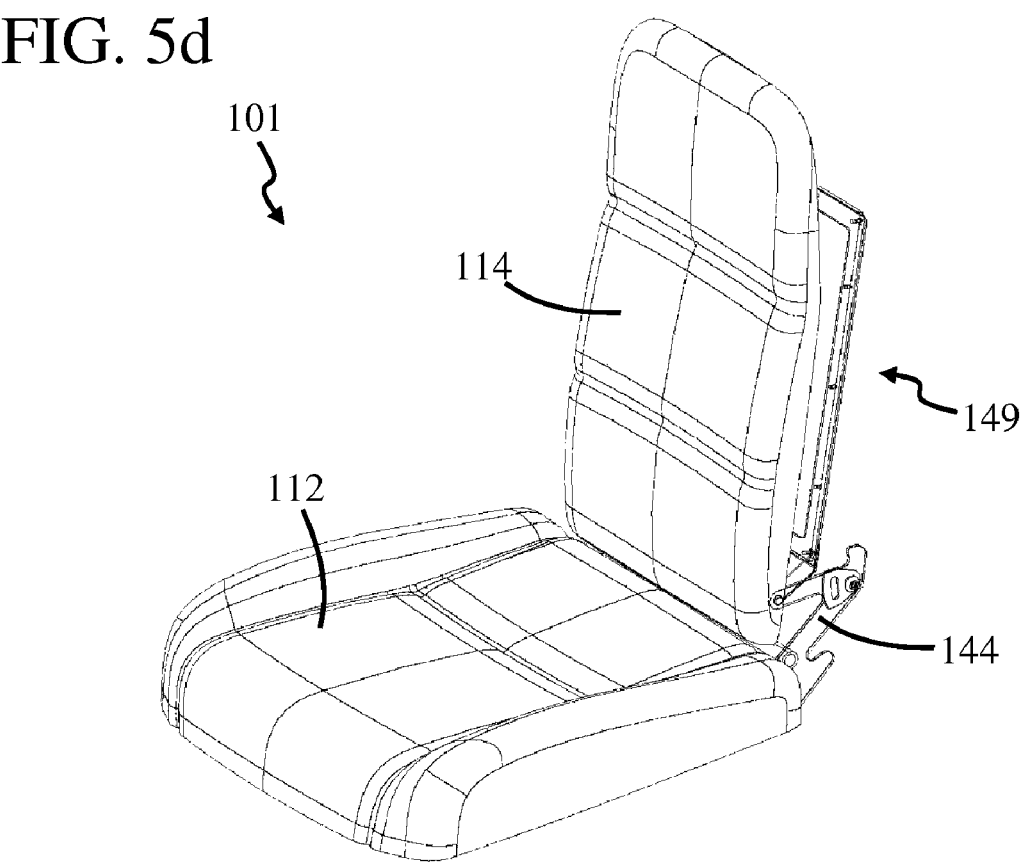
FIGS. 5d, 5e and 5f are perspective views of the reconfigurable safety chair of FIG. 1 with a child chair in stowed and deployed positions.
Figure 5E:
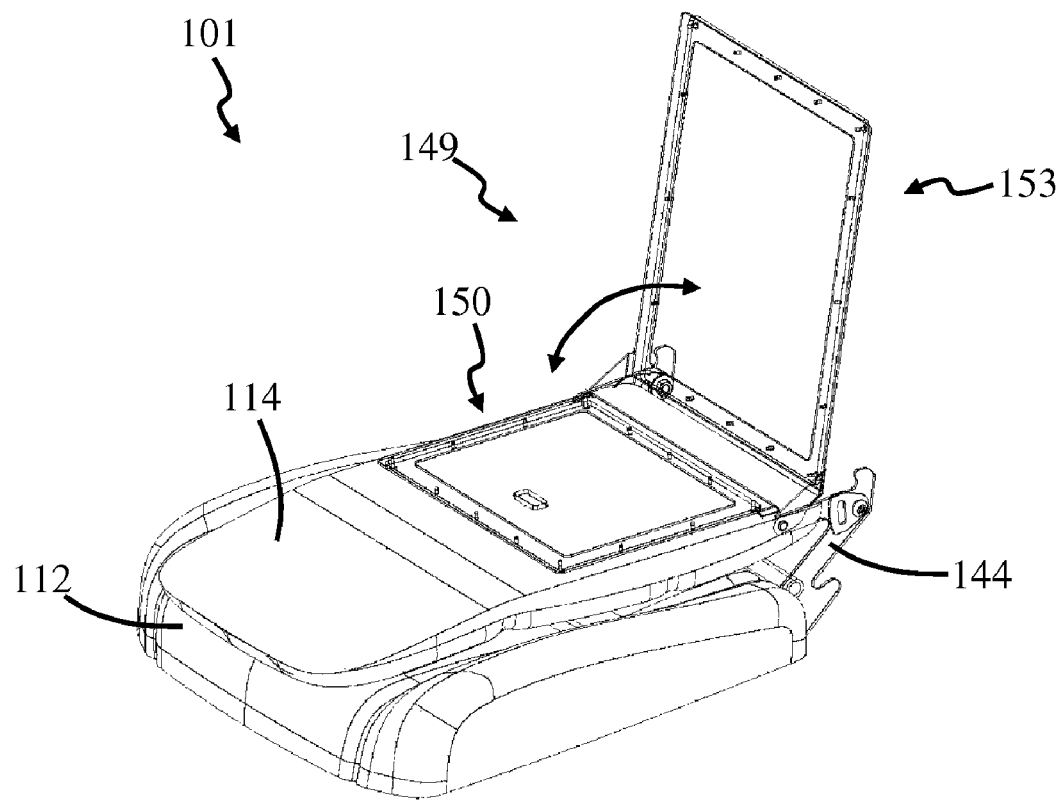
Figure 5F:
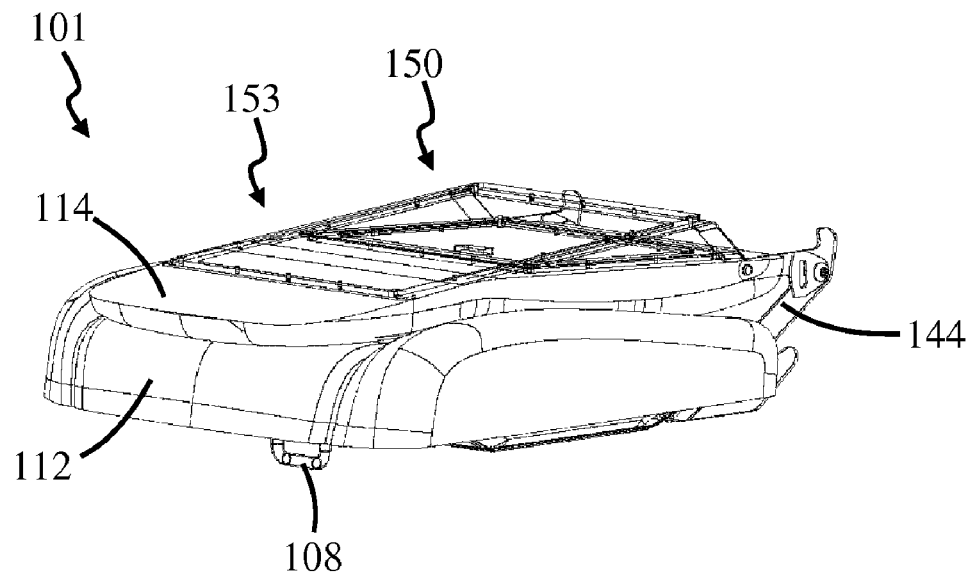

FIG. 5c is an exploded perspective view of safety chair 101, and FIGS. 5d, 5e and 5f are perspective views of safety chair 101 with child seat 150 and child seat back 153 in various positions. In FIG. 5d, child seat 150 and child seat back 153 are in stowed positions. Child seat 150 and child seat back 153 can have many different configurations. In this embodiment, child seat 150 includes a child seat frame 151 which carries a child seat support 152. Further, child seat back 153 includes a child seat back frame 154 which carries a child seat back support 155.

As mentioned above, child seat 150 and child seat back 153 can be repeatably moveable between the stowed and deployed positions in many different ways. In this embodiment, safety chair 101 includes a flip bracket 144 coupled with seat frame 130 (FIG. 4). Flip bracket 144 can be coupled with seat frame 130 in many different ways. In this embodiment, flip bracket 144 is coupled with frame braces 142 and 143 so that it extends between right and left frame members 133 and 134.

In this embodiment, child chair assembly 149 is rotatably coupled with flip bracket 144. Child chair assembly 149 is rotatably coupled with flip bracket 144 so that child seat 150 and child seat back 153 can be repeatably moveable between the stored and deployed positions. Child seat 150 and child seat back 153 can be repeatably moveable between the stored and deployed positions independently of each other. Hence, child seat 150 and child seat back 153 can both be in stowed positions, as shown in FIG. 5d, and child seat 150 and child seat back 153 can both be in deployed positions, as shown in FIG. 5f. Further, child seat 150 and child seat back 153 can be in the deployed and stowed positions, respectively, as shown in FIG. 5e, wherein a child can sit on child seat 150 and lean back against child seat back 153. Child chair assembly 149 can be rotatably coupled with flip bracket 144 in many different ways, such as by using one or more fasteners. It should be noted that child seat 150 and child seat back 153 move through opening 139 when moving between the stowed and deployed positions.

Figure 5G:
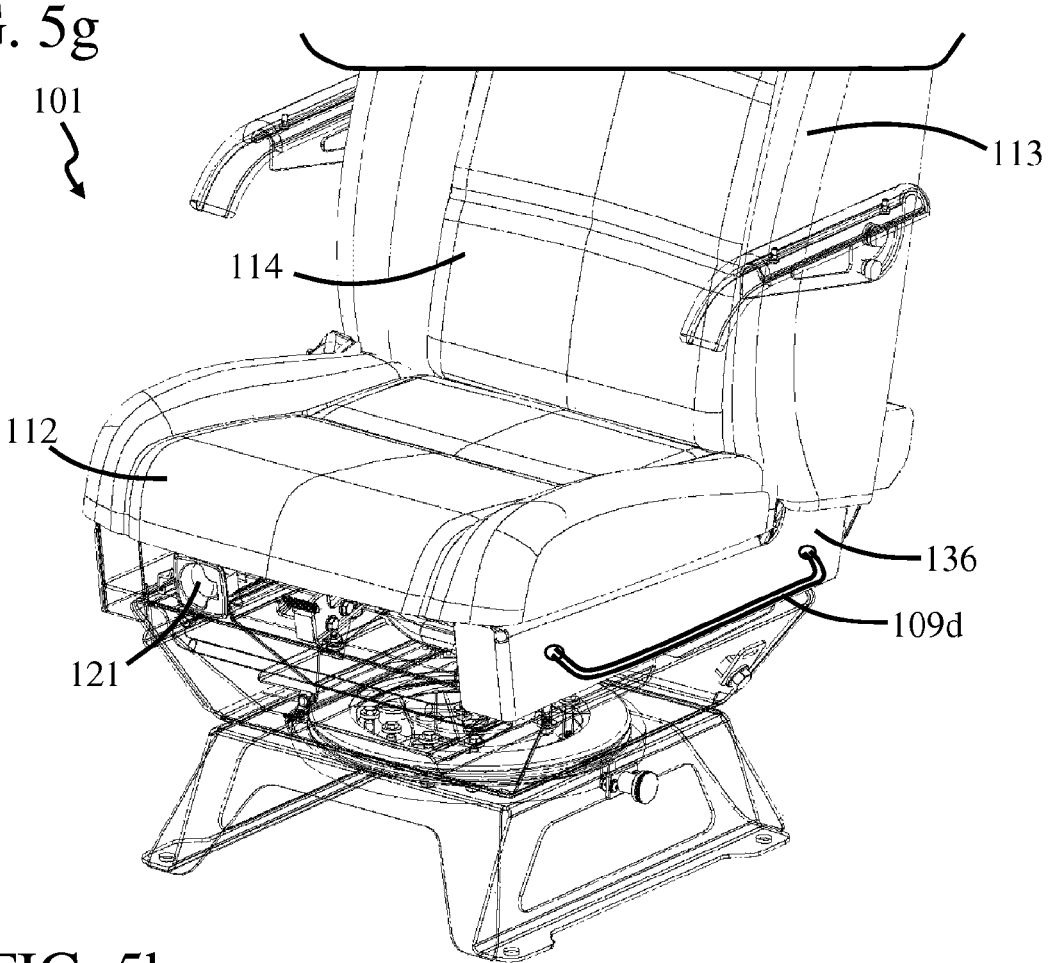
FIGS. 5g and 5h are perspective and side views, respectively, of the safety chair of FIG. 1 with a bar for carrying a seat pan cushion and removeable seat pan cushion.

FIGS. 5g and 5f are perspective and side views, respectively, of safety chair 101 with a bar 109d for carrying seat pan cushion 112 and removeable seat pan cushion 114. In this embodiment, bar 109d is carried by left frame 134, but it could be carried by right frame member 133 if desired. In particular, bar 109d is carried by lower frame member 136 and extends outwardly therefrom to form an opening between it and lower frame member 136. The opening between bar 109d and lower frame member 136 is sized and dimensioned so that child seat back 153 can extend therethrough. In this way, child seat back 153 is positioned towards left frame 134, and removeable seat pan cushion 114, child seat 150 and seat pan cushion 112 are positioned away from chair base 110.

Figure 6A:
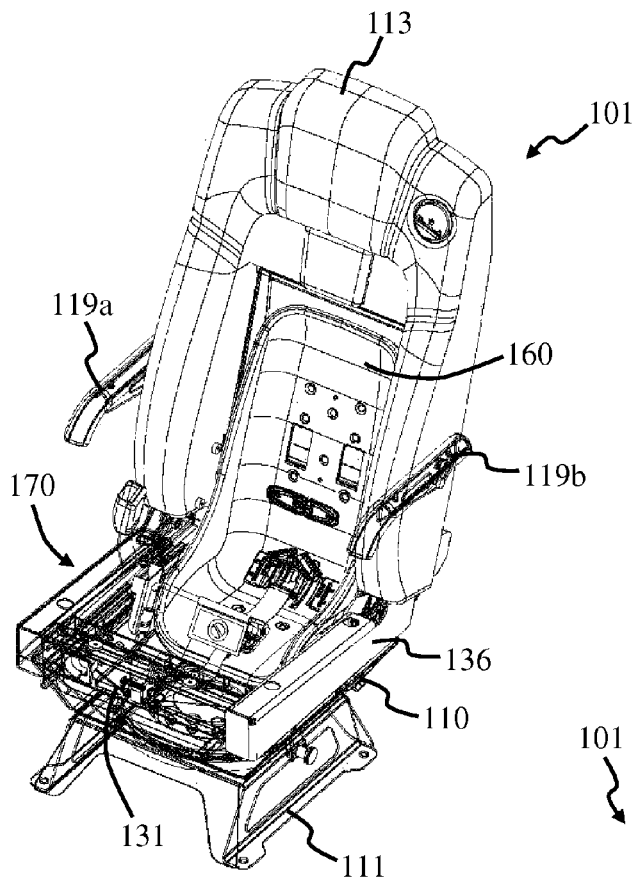
FIGS. 6a and 6b are perspective views of reconfigurable safety chair of FIG. 1 configured to carry an infant.
Figure 6B:
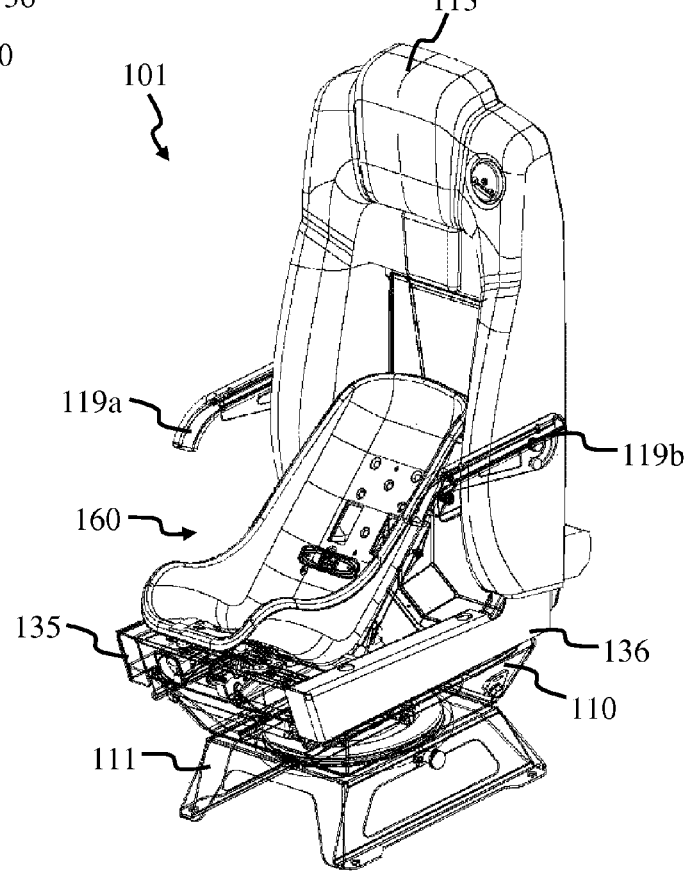

FIGS. 6a and 6b are perspective views of reconfigurable safety chair 101 configured to carry an infant, in accordance with the invention. In this embodiment, safety chair 101 includes an infant chair 160 which is repeatably moveable between stowed and deployed positions. In FIGS. 6a and 6b, infant chair 160 is shown in stowed and deployed positions, respectively, wherein infant chair 160 includes an upright seat back and a forward extending seat. In the stowed position, infant chair 160 is housed within chair base 110 so that chair 101 can be configured to carry an adult or child, as discussed above. In the stowed position, infant chair 160 is housed within chair base 110 so it is enclosed by chair base 110, seat pan cushion 112 and moveable seat back cushion 114. In the deployed position, infant chair 160 extends out of chair base 110 so that infant chair 160 can carry an infant. It should be noted that infant chair 160 moves through opening 139 when moving between the stowed and deployed positions. When infant chair 160 moves between the stowed and deployed positions, it moves through the opening of adult seat back housing 113b.

In this embodiment, safety chair 101 includes an interlock assembly 170 which provides many different functions. For example, interlock assembly 170 restricts the ability of infant chair 160 to move between the stowed and deployed positions. Interlock assembly 170 does not allow infant chair 160 to move from the stowed position to the deployed position unless safety chair 101 is facing a predetermined direction. For example, in one embodiment, interlock assembly 170 does not allow infant chair 160 to move from the stowed position to the deployed position unless safety chair 101 is facing towards rear 102 (FIG. 1) of vehicle 100. Hence, the predetermined direction is towards rear 102 and away from front 103, as shown by the positioning of chair 101 in FIG. 1. In this way, interlock assembly 170 does not allow infant chair 160 to move from the stowed position to the deployed position unless safety chair 101 is directed away from front 103 (FIG. 1) of vehicle 100. It is useful to have an infant carried by safety chair 160 face rear 102 and away from front 103 in case vehicle 100 is involved in an accident. Thus, interlock assembly 170 allows infant chair 160 to be repeatably moveable between the stowed and deployed positions with chair base 110 when chair base 110 is in a predetermined position. Further, interlock assembly 170 restricts infant chair 160 from moving between the stowed and deployed positions in response to chair base 110 not being in the predetermined position.

Interlock assembly 170 also restricts the ability of chair base 110 to rotate in response to infant chair 160 being in the deployed position. In particular, interlock assembly 170 restricts the ability of chair base 110 to rotate relative to chair stand 111 in response to infant chair 160 being in the deployed position. Restricting the ability of chair base 110 to rotate when infant chair 160 is deployed is useful to ensure that safety seat faces the predetermined direction while infant chair 160 is deployed.

Figure 7A:
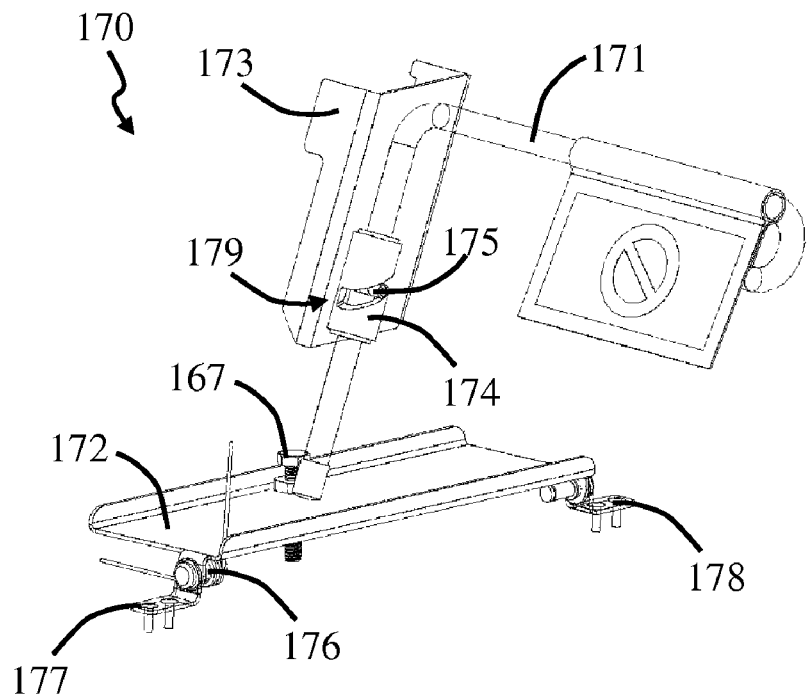
FIGS. 7a and 7b are perspective views of an interlock assembly included with the reconfigurable safety chair of FIG. 1.
Figure 7B:
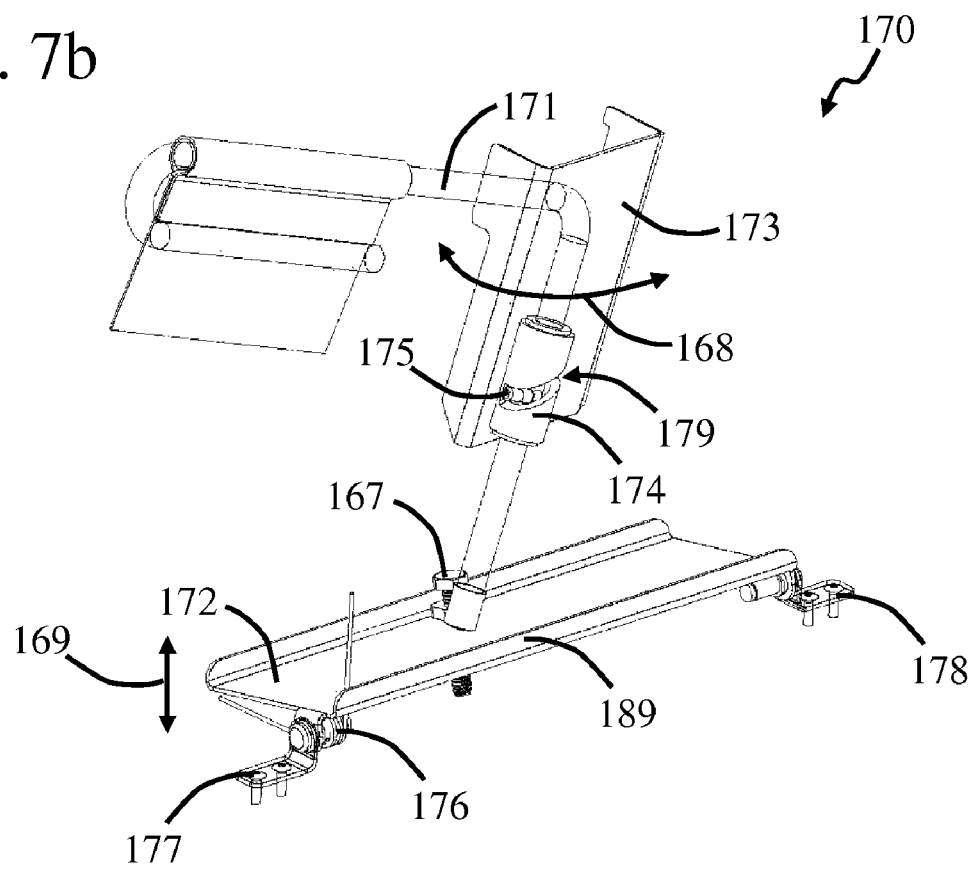

FIGS. 7a and 7b are perspective views of one embodiment of interlock assembly 170, in accordance with the invention. Interlock assembly 170 is shown in locked and unlocked positions in FIGS. 7a and 7b, respectively. In this embodiment, interlock assembly 170 includes an interlock base 172 which is coupled to chair base 110 with tabs 177 and 178. Interlock base 172 is capable of rotating relative to tabs 177 and 178.

In this embodiment, interlock assembly 170 includes a spring 176 coupled with tab 177, wherein spring 176 is compressible in response to the rotation of interlock base 172 relative to tabs 177 and 178. A portion of spring 176 extends through interlock base 172 and engages a lip 189 thereof. Further, interlock assembly 170 includes a rotation restrictor 167 carried by interlock base 172, wherein restrictor 167 is embodied as a bolt. Restrictor 167 is positioned so that it is repeatably moveable through opening 199a in response to the rotation of interlock base 172 relative to tabs 177 and 178.

In this embodiment, interlock assembly 170 includes a rotating bar 171 which extends upwardly from interlock base 172. Rotating bar 171 can have many different shapes, but it is L-shaped in this embodiment so it has an upwardly extending portion and an outwardly extending portion. Interlock assembly 170 includes an interlock bracket 173 which holds the upwardly extending portion of rotating bar 171 to right frame member 133 (FIG. 4). In particular, interlock bracket 173 holds the upwardly extending portion of rotating bar 171 to lower frame member 135.

Interlock bracket 173 can hold rotating bar 171 in many different ways. In this embodiment, interlock assembly 170 includes an interlock tube 174 with an opening extending therethrough. Here, interlock tube 174 is cylindrical in shape and the opening extends between opposed ends of tube 174. Interlock tube 174 includes a groove 179 which receives a pin 175, wherein pin 175 is coupled with the upwardly extending portion of rotating bar 171 and rotates therewith. Groove 179 guides the movement of pin 175 in response to rotating bar 171 being rotated. Groove 179 extends around the outer diameter of interlock tube 174 so that the upwardly extending portion of rotating bar 171 moves towards and away from interlock base 172 in response to pin 175 moving through groove 179. In this way, the upwardly extending portion of rotating bar 171 moves towards and away from interlock base 172 in response to rotating bar 171 being rotated.

In operation, when the outwardly extending portion of rotating bar 171 moves, as indicated by a movement arrow 168, from the position of FIG. 7a to the position of FIG. 7b, pin 175 is moved through groove 179 and the downwardly extending portion of bar 171 is moved downwardly in response. The downwardly extending portion of bar 171 is moved downwardly so that it engages interlock base 172 and interlock base 172 is rotated downwardly about tabs 177 and 178 in response, as indicated by a movement arrow 169 of FIG. 7b. Lip 189 engages the portion of spring 176 extending through interlock base 172 and spring 176 is biased in response to pressure applied by lip 189.

When the outwardly extending portion of rotating bar 171 moves, as indicated by movement arrow 168, from the position of FIG. 7b to the position of FIG. 7a, pin 175 is moved through groove 179 and the downwardly extending portion of bar 171 is moved upwardly in response. The downwardly extending portion of bar 171 is moved upwardly so that it disengages interlock base 172 and interlock base 172 is rotated upwardly about tabs 177 and 178 in response, as indicated by movement arrow 169 of FIG. 7b. Lip 189 disengages the portion of spring 176 extending through interlock base 172 and spring 176 is unbiased in response.

Figure 3C:
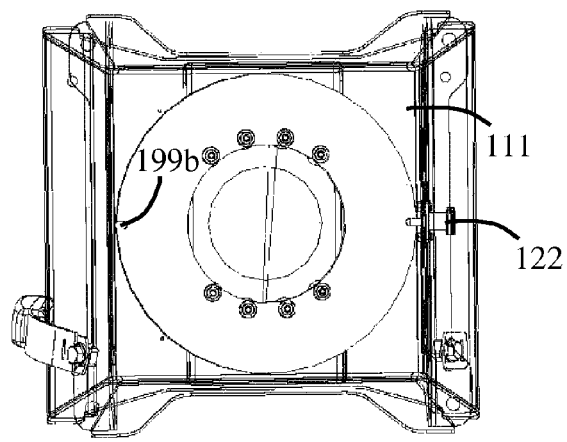
FIGS. 3c and 3d are bottom and top views of the chair base and chair stand of FIGS. 3a and 3b.
Figure 3D:
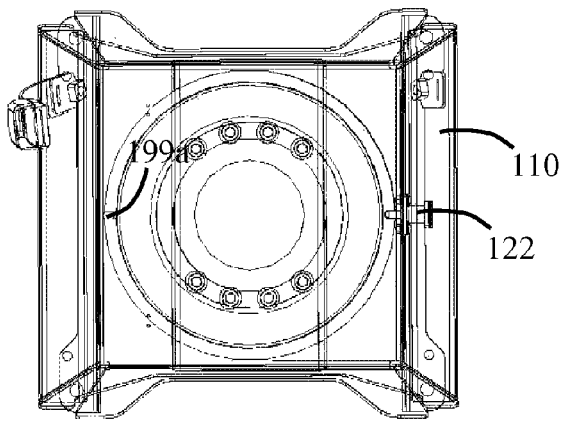

It should be noted that rotating bar 171 is allowed to rotate from the locked position shown in FIG. 7a to the unlocked position shown in FIG. 7b when restrictor 167 can extend through openings 199a and 199b (FIGS. 3c and 3d). Restrictor 167 can extend through openings 199a and 199b when they are aligned with each other. As discussed in more detail above, openings 199a and 199b are aligned with each other when retractable spring plunger 122 is capable of being received by slot 107b. In this embodiment, retractable spring plunger 122 is capable of being received by slot 107b when safety chair 101 faces rear 102 of vehicle 100. When openings 199a and 199b are not aligned with each other, restrictor 167 will extend through opening 199a and engage chair stand 111. The rotation of rotating rod 171 is restricted in response to restrictor 167 engaging chair stand 111. Further, the rotation of rotating rod 171 is allowed in response to restrictor 167 extending through openings 199a and 199b.

Thus, in the locked position, infant chair 160 is not allowed to move from the stowed to deployed position. In the locked position, chair base 110 is allowed to rotate relative to chair stand 111. In this way, infant chair 160 is restricted from moving between the stowed and deployed positions in response to chair base 110 not being in a predetermined position. Further, in the unlocked position, infant chair is allowed to move from the stowed to the deployed position. In the unlocked position, chair base 110 is not allowed to rotate relative to chair stand 111. In this way, infant chair 160 is repeatably moveable between the stowed and deployed positions with chair base 110 in response to chair base 110 being in the predetermined position.

Figure 8A:
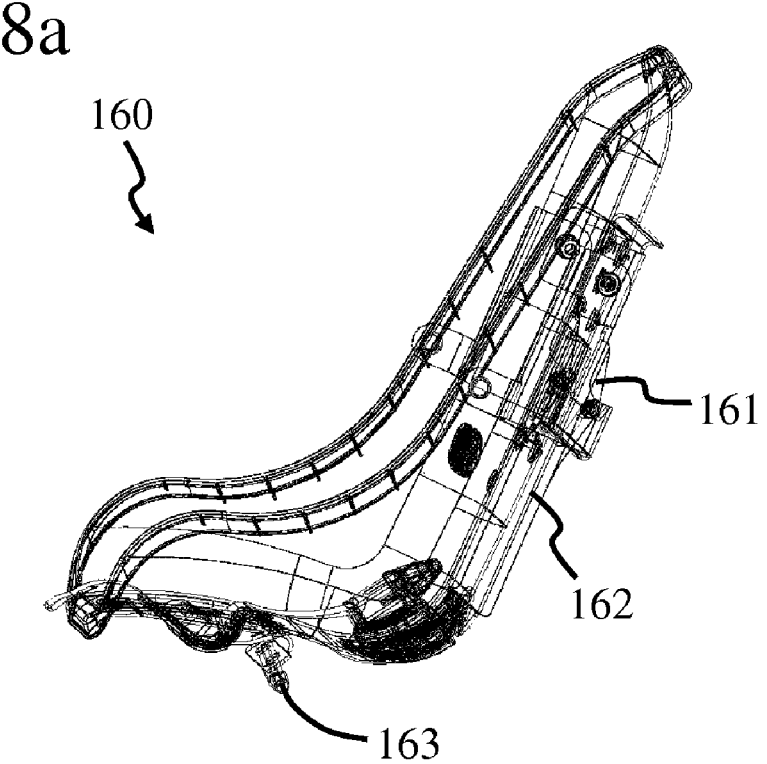
FIGS. 8a and 8b are side perspective views of an infant chair included with the reconfigurable safety chair of FIG. 1 in stowed and deployed positions, respectively.
Figure 8B:
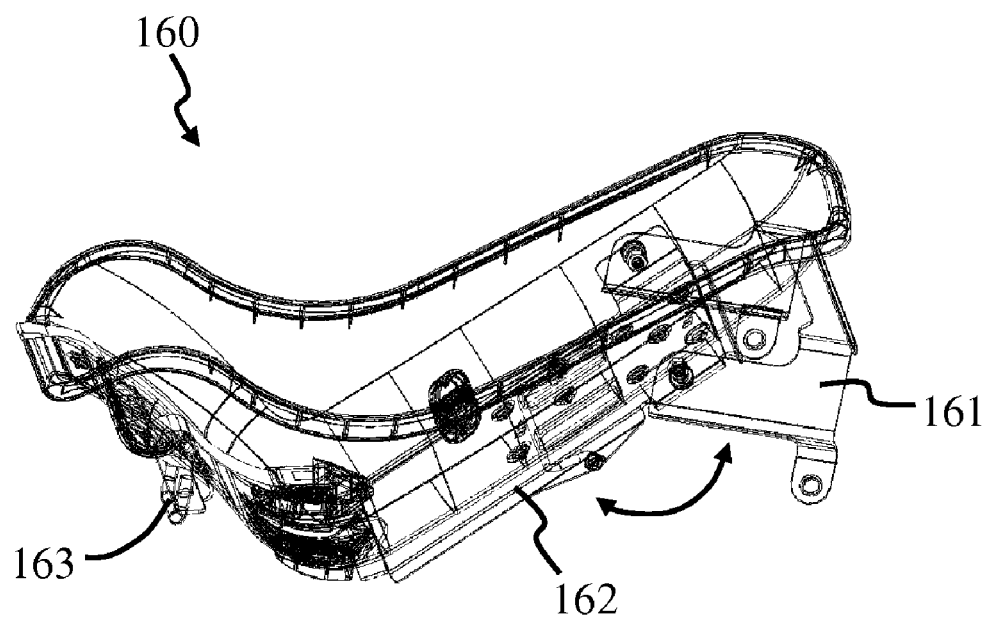
Figure 8C:
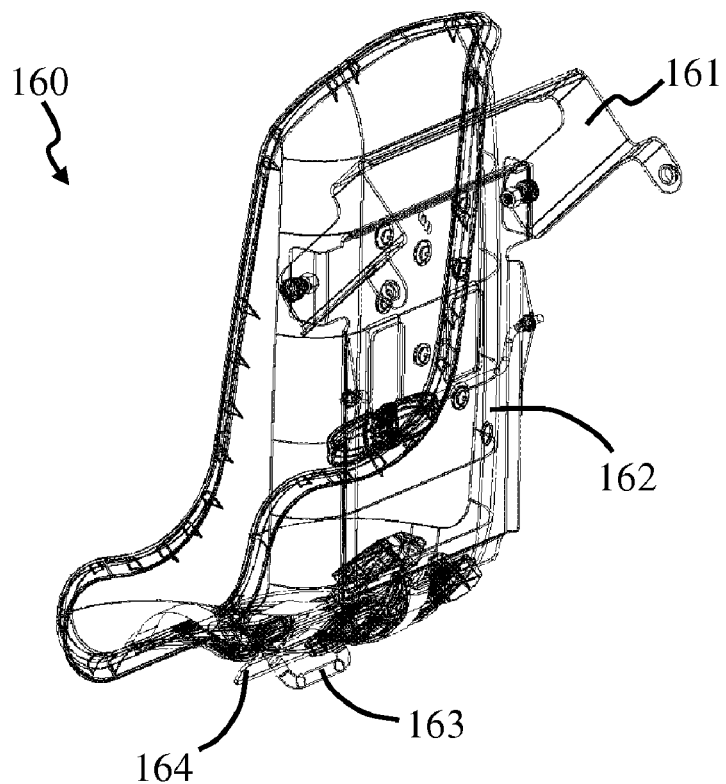
FIG. 8c is a back perspective view of the infant chair of FIGS. 8a and 8b.

FIGS. 8a and 8b are side perspective views of one embodiment of infant chair 160. In this embodiment, infant chair 160 includes an infant flip rod plate 162 coupled to the back of the upright seat back. Further, infant chair 160 includes an infant pivot structure bracket 161 rotatably coupled with infant flip rod plate 162. Infant pivot structure bracket 161 can be rotatably coupled with infant flip rod plate 162 in many different ways, such as with a fastener. Infant pivot structure bracket 161 is rotatably coupled with infant flip rod plate 162 so that it can repeatably move between stowed and deployed positions, as shown in FIGS. 8a and 8b, respectively. Infant pivot structure bracket 161 and infant flip rod plate 162 are shown in more detail in the rear perspective view of chair 160 shown in FIG. 8c.

In this embodiment, infant chair 160 includes an infant striker bar 163 coupled with the forward extending seat. Infant striker bar 163 can be coupled with the forward extending seat of chair 160 in many different ways. In this embodiment, infant striker bar 163 is coupled with the forward extending seat with an infant striker bracket 164. Infant striker bar 163 is positioned to engage latch 106 of front cross member 131 when infant chair 160 is moved to the deployed position. Infant chair 160 is coupled to front cross member 131 when latch 106 receives infant striker bar 163. Infant chair 160 is restricted from moving from the deployed position to the stowed position when latch 106 receives infant striker bar 163. Infant striker bar 163 can be released from latch 106 by pulling handle 121. It should be noted that reconfigurable safety chair 101 typically includes an infant harness to safely hold the infant, one of which will be discussed in more detail presently.

Figure 8D:
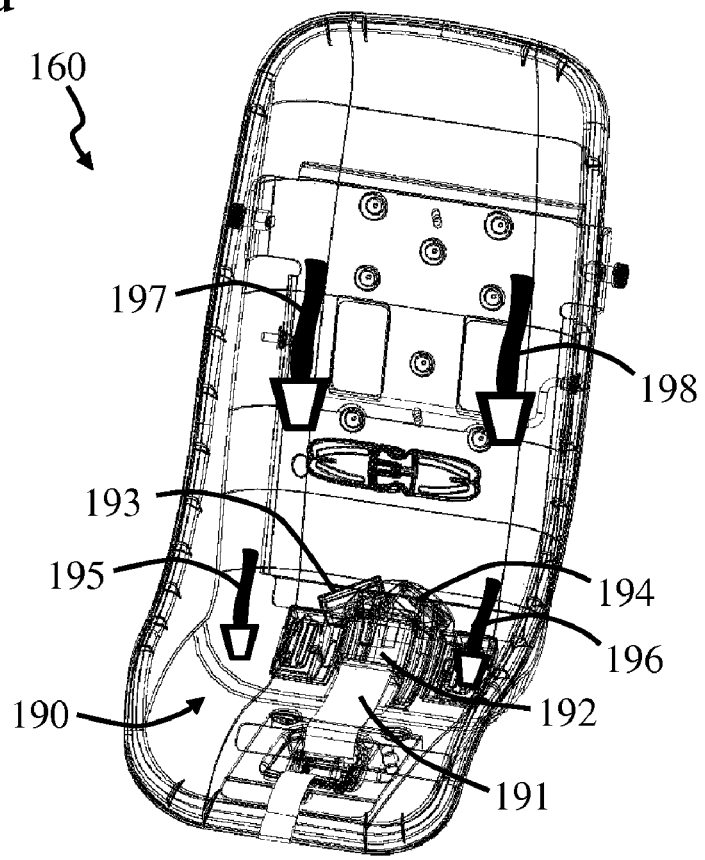
FIG. 8d is a front perspective view of one embodiment of a child harness, which can be used to hold an infant to the infant chair of FIGS. 8a and 8b.

FIG. 8d is a perspective view of one embodiment of a child harness 190, which can be used to hold an infant to infant chair 160. In this embodiment, child harness 190 includes infant crotch strap webbing attached to chair 160 and an infant waist strap buckle 192. Crotch strap webbing and infant waist strap buckle 192 are positioned so that they extend between the legs of an infant sitting on infant seat 160. Infant waist strap buckle 192 is attached to infant torso buckles 193 and 194. Child harness 190 includes waist straps 195 and 196 attached to infant chair 160. Further, child harness 190 includes torso straps 197 and 198 attached to infant chair 160. Waist straps 195 and 196 can be attached to waist strap buckle 192 and torso straps 197 and 198 can be attached to torso strap buckles 193 and 194. In this way, infant harness 190 can be used to hold an infant to infant chair 160.

There are several accessories that can be used with reconfigurable safety chair 101.

Figure 9A:
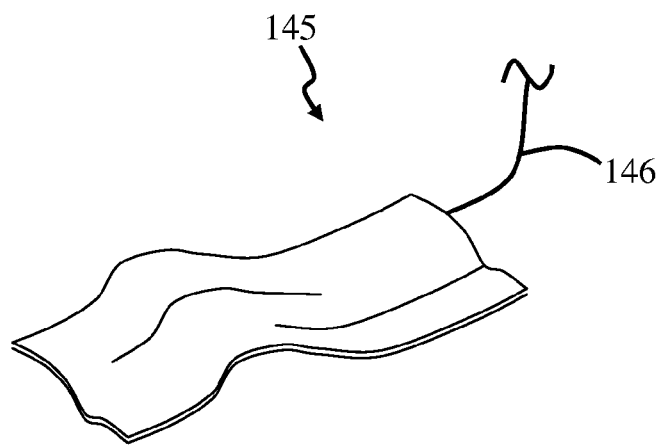
FIG. 9a is a perspective view of an accessory embodied as a heating pad, which can be used with the reconfigurable safety chair of FIG. 1.

FIG. 9a is a perspective view of an accessory embodied as a heating pad 145, which can be used with safety chair 101. Heating pad 145 allows the temperature of infant chair 160 to be adjusted. In this embodiment, a power cord 146 provides power to heating pad 145. Power cord 146 can be plugged into a power source to provide power to heating pad 145. The power source can be positioned at many different locations. In one embodiment, reconfigurable safety chair 101 includes an electrical outlet 132, as shown in FIG. 2, which operates as the source of power. Electrical outlet 132 can be positioned at many different locations with safety chair 101, but here it is carried by chair base 110. Other power sources that can be used to provide power to heating pad 145 include a battery.

In this embodiment, heating pad 145 is carried by infant chair 160 so that it can flow heat to the infant being carried by it. This is useful because the temperature within emergency response vehicle 100 is generally at a temperature value that can cause the infant's temperature to decrease too much. For example, in most ambulances, the temperature is between about seventy-five degrees Fahrenheit to about eighty degrees Fahrenheit. It is well-known that an infant exposed to a temperature in this temperature range is more likely to suffer from adverse medical conditions, such as hypothermia. Hence, heating pad 145 is useful to provide the infant with a desired temperature. The desired temperature is usually that in which the infant is in an incubated state. In this embodiment, heating pad 145 is a single use pad because it is used once and then discarded.

Figure 9B:
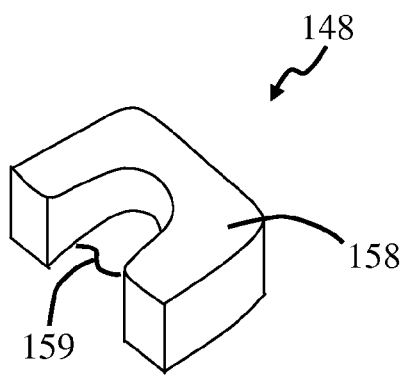
FIG. 9b is a perspective view of an accessory embodied as a neck roll, which can be used with the reconfigurable safety chair of FIG. 1.

FIG. 9b is a perspective view of an accessory embodied as a neck roll 148, which can be used with safety chair 101. Neck roll 148 is positioned to hold the infant's head when the infant is carried by infant chair 160. In this way, the infant's head is less likely to be undesirably twisted or turned in response to the movement of emergency response vehicle 100, such as when it accelerates and decelerates, and when it turns a corner. Neck roll 148 is also useful to hold the infant's head in case emergency response vehicle 100 is involved in an accident.

The neck roll can have many other configurations. In this embodiment, neck roll 148 includes a neck roll body 158 with a head opening 159 extending therethrough. Neck roll body 158 is shaped and dimensioned to engage infant chair 160, and head opening 159 is shaped and dimensioned to receive the head of an infant when carried by infant chair 160. Neck roll body 158 restricts the ability of the infant's head to rotate.

Figure 9C:
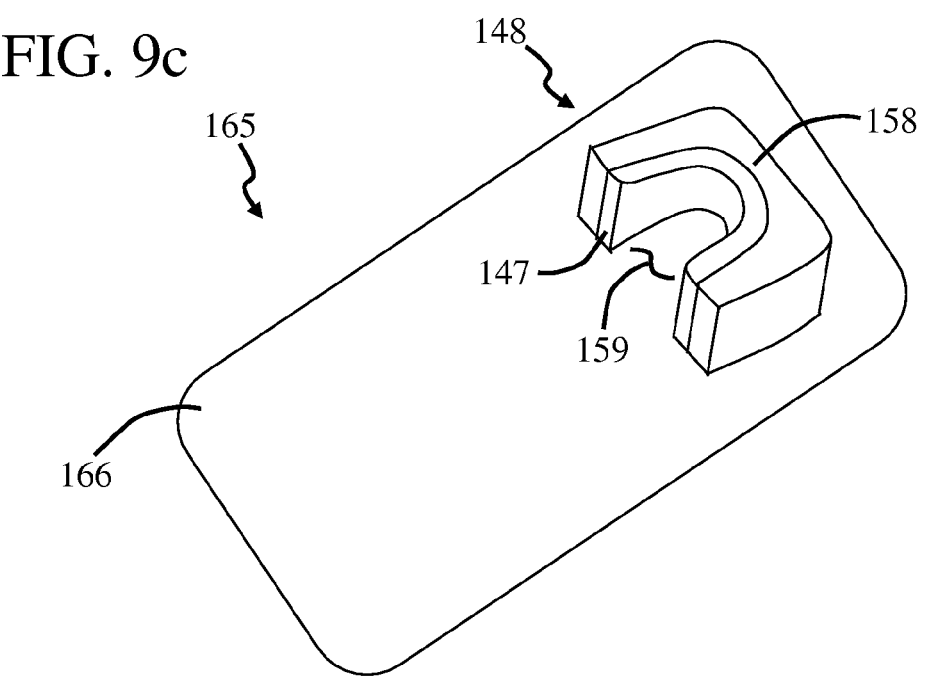
FIG. 9c is another embodiment of a neck roll, which can be used with the reconfigurable safety chair of FIG. 1.

FIG. 9c is another embodiment of a neck roll, which is denoted as neck roll 165. In this embodiment, neck roll 165 includes an infant body pad 166 coupled with neck roll 148. It should be noted that infant body pad 166 and neck roll 148 can be a single integral piece or separate pieces coupled together. It should also be noted that heating pad 145 can be integrated with infant body pad 166, if desired.

In this embodiment, neck roll body 158 includes an inner cushion 147a and an outer cushion 147b, wherein outer cushion 147b is coupled with infant body pad 166 and inner cushion 147a is removeably coupled with infant body pad 166 and outer cushion 147b. When inner cushion 147a is coupled with outer cushion 147b and infant body pad 166, neck roll 165 can hold a smaller size infant with a smaller sized head. Further, when inner cushion 147a is not coupled with outer cushion 147b and infant body pad 166, neck roll 165 can hold a larger size infant with a larger sized head. In this way, neck roll 165 can be configured to carry infants of different sizes. Inner and outer cushions 147a and 147b can be removeably attached to pad 166 in many different ways, such as by using hook and loop tape.

A small size infant and a large size infant can have weights in many different weight ranges. For example, a small size infant typically has a weight between about one pound to ten pounds and a large size infant generally has a weight between about ten pounds to fifteen pounds. It should be noted that small and large infant's can have weights in different weight ranges. Inner and outer cushions 147a and 147b extend away from pad 166 far enough to hold the head of the infant. The distance that cushions 147a and 147b extend outwardly from pad 166 can be in many different distance ranges, such as between about five inches and ten inches.

In some embodiments, an anti-microbial agent and/or anti-fungal agent is applied to reconfigurable safety chair 101. The anti-microbial and anti-fungal agents can be of many different types, but they are generally chemicals which reduce the amount of microbes and fungus that can survive on safety chair 101. In some embodiments, the anti-microbial agent and/or anti-fungal agent is included with the material used to fabricate the component of safety chair 101. Examples of materials that can be used to fabricate safety chair 101 include CEL-SPAN 300. Examples of agents that can be used include CEL-SPAN 504, CEL-SPAN 704 and CEL-SPAN 713. More information regarding these materials and agents can be provided by Phoenix Plastics Company of Conroe, Tex. and KMI Chemicals of Richmond, British Colombia, Canada.

The anti-microbial agent and/or anti-fungal agent can be applied to many different locations of safety chair 101. For example, these agents can be applied to child chair assembly 149, infant chair 160, seat pan cushion 112, seat back cushion 113, moveable seat back cushion 114, as well as chair base 110. In general, the anti-microbial agent and/or anti-fungal agent are applied to locations of safety chair 101 that are likely to come into human contact. Further, the anti-microbial agent and/or anti-fungal agent are applied to locations of safety chair 101 that are likely to harbor the growth of microbes and fungus.

Figure 10A:
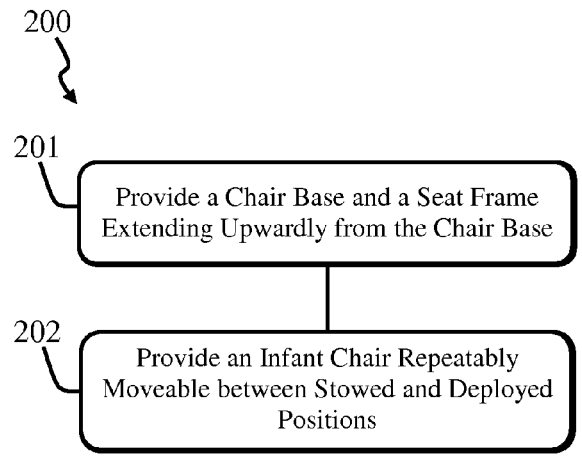
FIGS. 10a, 10b and 10c are flow diagrams of methods, in accordance with the invention, of manufacturing a reconfigurable safety chair.

FIG. 10a is a flow diagram of a method 200, in accordance with the invention, of manufacturing a reconfigurable safety chair. In this embodiment, method 200 includes a step 201 of providing a chair base and a seat frame extending upwardly from the chair base. Method 200 includes a step 202 of providing an infant chair repeatably moveable between stowed and deployed positions. In some embodiments, the infant chair is repeatably moveable between stowed and deployed positions with the chair base.

The infant chair is repeatably moveable between the stowed and deployed positions when the chair base is in a predetermined position. The infant chair is restricted from moving between the stowed and deployed positions in response to the chair base not being in a predetermined position. The infant chair moves through an opening of the seat frame when moving between the stowed and deployed positions.

It should be noted that method 200 can include many other steps. For example, in some embodiments, method 200 includes a step of providing a child chair repeatably moveable between stowed and deployed positions. In some embodiments, the child chair is repeatably moveable between stowed and deployed positions with the seat frame. The child chair moves through an opening of the seat frame when moving between the stowed and deployed positions. In these embodiments, the child chair is repeatably rotatable with the seat frame. In some embodiments, method 200, as well as the methods discussed below, can include a step of applying an anti-microbial and/or anti-fungal agent to the safety chair.

Figure 10B:
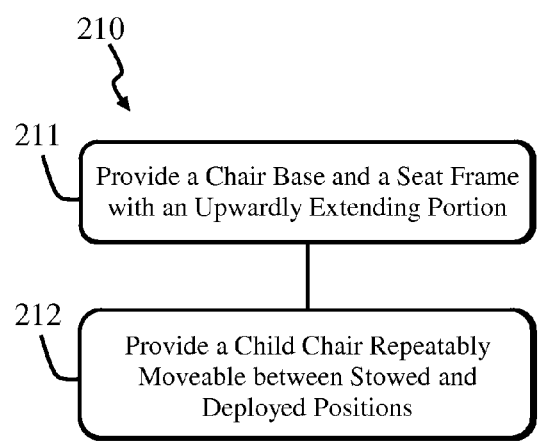

FIG. 10b is a flow diagram of a method 210, in accordance with the invention, of manufacturing a reconfigurable safety chair. In this embodiment, method 210 includes a step 211 of providing a chair base and a seat frame with an upwardly extending portion. Method 210 includes a step 212 of providing a child chair repeatably moveable between stowed and deployed positions. In some embodiments, the child chair is repeatably moveable between stowed and deployed positions with the seat frame. The child chair moves through an opening of the seat frame when moving between the stowed and deployed positions.

It should be noted that method 210 can include many other steps. For example, in some embodiments, method 210 includes a step of providing a flip bracket which rotatably couples the child chair with the seat frame. In these embodiments, method 210 can include a step of providing an infant chair repeatably moveable between stowed and deployed positions. In some embodiments, the infant chair is repeatably moveable between stowed and deployed positions with the chair base. The infant chair moves through an opening of the seat frame when moving between the stowed and deployed positions. The infant chair is repeatably moveable between the stowed and deployed positions when the chair base is directed in a predetermined direction. The infant chair is restricted from moving between the stowed and deployed positions in response to the chair base not being directed in the predetermined direction.

Figure 10C:
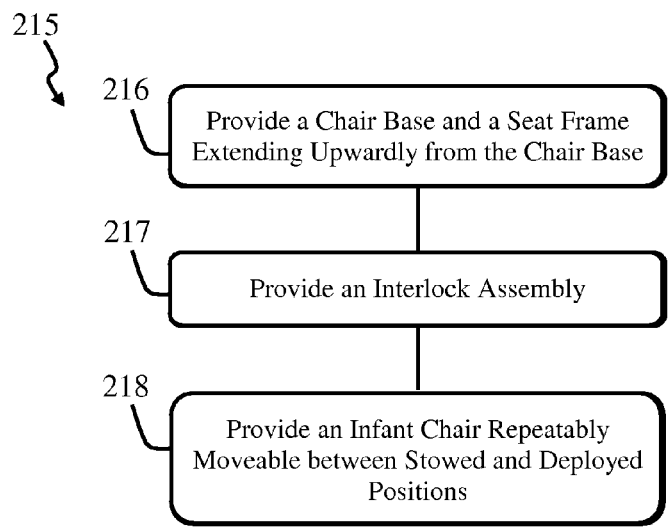

FIG. 10c is a flow diagram of a method 215, in accordance with the invention, of manufacturing a reconfigurable safety chair. In this embodiment, method 215 includes a step 216 of providing a chair base and a seat frame extending upwardly from the chair base. Method 215 includes a step 217 of providing an interlock assembly and a step 218 of providing an infant chair repeatably moveable between stowed and deployed positions with the chair base.

The interlock assembly restricts and allows the ability of the infant chair to move between the stowed and deployed positions. The interlock assembly restricts the ability of the chair base to rotate in response to the infant chair being in the deployed position. The interlock assembly allows the infant chair to move between the stowed and deployed positions with the chair base when the chair base is in a predetermined position.

It should be noted that method 215 can include many other steps. For example, in some embodiments, method 215 includes a step of providing a seat pan cushion and moveable seat back cushion rotatably coupled together. In these embodiments, method 215 includes a step of providing a flip bracket which rotatably couples the seat pan cushion and moveable seat back cushion together. In some of these embodiments, method 215 can include a step of providing a child chair rotatably coupled with the flip bracket.

FIG. 11a is a flow diagram of a method 220, in accordance with the invention, of installing a reconfigurable safety chair. In this embodiment, method 220 includes a step 221 of providing a chair base and a seat frame extending upwardly from the chair base. Method 220 includes a step 222 of providing an infant chair repeatably moveable between stowed and deployed positions with the chair base. In this embodiment, the safety chair includes the chair base, seat frame and infant chair. In some embodiments, the safety chair includes a child chair repeatably moveable between stowed and deployed positions with the seat frame. Method 220 includes a step 223 of positioning the safety chair so that it is carried by a vehicle.

The safety chair can be positioned so that it is carried by the vehicle in many different ways. In one embodiment, the safety chair is positioned so that the chair base is coupled with a chair stand carried by the vehicle. In some situations, the chair stand is installed with the vehicle and, in other situations, the chair stand is included with the reconfigurable safety chair. The chair base and chair stand are typically rotatably coupled together so that the chair base can rotate relative to the chair stand. It should be noted that, in some embodiments, method 220 includes a step of removing a chair already carried by the vehicle, wherein the reconfigurable safety chair of the invention replaces the chair that is removed.

FIG. 11b is a flow diagram of a method 230, in accordance with the invention, of installing a reconfigurable safety chair. In this embodiment, method 230 includes a step 231 of providing a chair base and a seat frame with an upwardly extending portion. Method 230 includes a step 232 of providing a child chair repeatably moveable between stowed and deployed positions with the seat frame. In this embodiment, the safety chair includes the chair base, seat frame and child chair. Method 230 includes a step 233 of positioning the safety chair at a desired location. The desired location can be at many different places. For example, the safety chair can be positioned so it is carried by a vehicle.

FIG. 11c is a flow diagram of a method 235, in accordance with the invention, of installing a reconfigurable safety chair. In this embodiment, method 235 includes a step 236 of providing a chair base and a seat frame extending upwardly from the chair base. Method 235 includes a step 237 of providing an interlock assembly and a step 238 of providing an infant chair repeatably moveable between stowed and deployed positions with the chair base. The safety chair includes the chair base, seat frame, infant chair and interlock assembly. Method 235 includes a step 239 of positioning the safety chair so that it is carried by the vehicle.

In some embodiments, the safety chair includes a seat pan cushion and moveable seat back cushion rotatably coupled together. In these embodiments, the safety chair can include a flip bracket which rotatably couples the seat pan cushion and moveable seat back cushion together. In some of these embodiments, the safety chair includes a child chair, wherein the child chair can be rotatably coupled with the flip bracket.

Figure 12A:
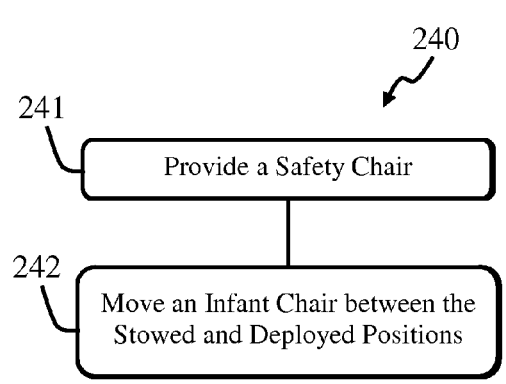
FIGS. 12a, 12b and 12c are flow diagrams of methods, in accordance with the invention, of operating a reconfigurable safety chair.

FIG. 12a is a flow diagram of a method 240, in accordance with the invention, of operating a reconfigurable safety chair. In this embodiment, method 240 includes a step 241 of providing a chair base and a seat frame extending upwardly from the chair base, and an infant chair repeatably moveable between stowed and deployed positions with the chair base. The safety chair includes the chair base, seat frame and infant chair. Method 240 includes a step 242 of moving the infant chair between the stowed and deployed positions. The infant chair typically moves through an opening of the seat frame when moving between the stowed and deployed positions.

In some embodiments, the infant chair is repeatably moveable between the stowed and deployed positions with the chair base when the chair base is in a predetermined position. Further, the infant chair is restricted from moving between the stowed and deployed positions in response to the chair base not being in a predetermined position. Hence, in some embodiments, method 240 includes a step of positioning the chair base in the predetermined position so that the infant chair can be repeatably moveable between the stowed and deployed positions.

It should be noted that, in some embodiments, the safety chair includes a child chair repeatably moveable between stowed and deployed positions with the seat frame. In these embodiments, the child chair is repeatably rotatable with the seat frame. Further, the child chair moves through an opening of the seat frame when moving between the stowed and deployed positions. Hence, in some embodiments, method 240 includes a step of moving the child chair between the stowed and deployed positions.

Figure 12B:
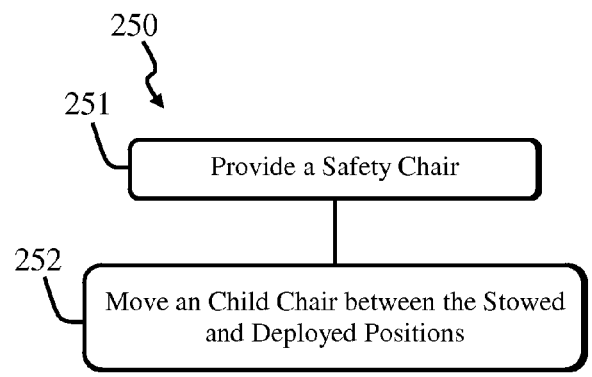

FIG. 12b is a flow diagram of a method 250, in accordance with the invention, of operating a reconfigurable safety chair. In this embodiment, method 250 includes a step 251 of providing a chair base, seat frame with an upwardly extending portion and a child chair repeatably moveable between stowed and deployed positions with the seat frame. The safety chair includes the chair base, seat frame and child chair. Method 250 includes a step 252 of moving the child chair between the stowed and deployed positions. The child chair typically moves through an opening of the seat frame when moving between the stowed and deployed positions.

It should be noted that, in some embodiments, method 250, the safety chair includes a flip bracket which rotatably couples the child chair with the seat frame. In these embodiments, method 250 can include a step of rotating the flip bracket to move the child chair between the stowed and deployed positions.

In some embodiments, the safety chair includes an infant chair repeatably moveable between stowed and deployed positions with the chair base. The infant chair moves through an opening of the seat frame when moving between the stowed and deployed positions. Hence, in some embodiments, method 250 includes a step of moving the infant chair between the stowed and deployed positions.

In some embodiments, the infant chair is repeatably moveable between the stowed and deployed positions with the chair base when the chair base is directed in a predetermined direction. The infant chair is restricted from moving between the stowed and deployed positions in response to the chair base not being directed in the predetermined direction. Hence, in some embodiments, method 250 includes a step of directing the chair base in the predetermined direction so that the infant chair can be moved between the stowed and deployed positions.

Figure 12C:
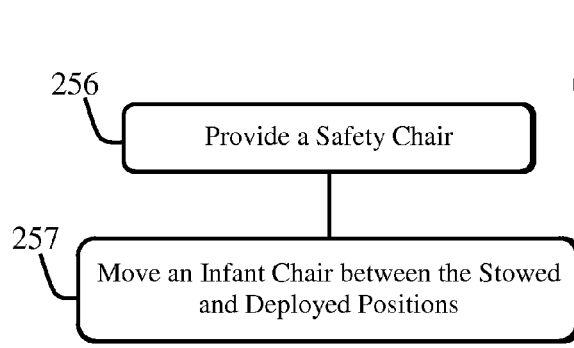

FIG. 12c is a flow diagram of a method 255, in accordance with the invention, of operating a reconfigurable safety chair. In this embodiment, method 255 includes a step 256 of providing a chair base, seat frame extending upwardly from the chair base, interlock assembly and an infant chair repeatably moveable between stowed and deployed positions with the chair base. The safety chair includes the chair base, interlock assembly, seat frame and infant chair. Method 255 includes a step 257 of moving the infant chair between the stowed and deployed positions. The infant chair typically moves through an opening of the seat frame when moving between the stowed and deployed positions.

The interlock assembly restricts and allows the ability of the infant chair to move between the stowed and deployed positions. When the interlock assembly is locked, it restricts the ability of the chair base to rotate in response to the infant chair being in the deployed position. When the interlock assembly is unlocked, it allows the infant chair to move between the stowed and deployed positions with the chair base when the chair base is in a predetermined position. Hence, in some embodiments, method 255 includes a step of moving the interlock assembly between the locked and unlocked positions.

It should be noted that, in some embodiments, the safety chair includes a seat pan cushion and moveable seat back cushion rotatably coupled together. In these embodiments, the seat pan cushion and moveable seat back cushion are rotatably coupled together with a flip bracket. Hence, in some embodiments, method 255 includes a step of rotating the seat pan cushion relative to the seat back cushion.

Figure 5H:
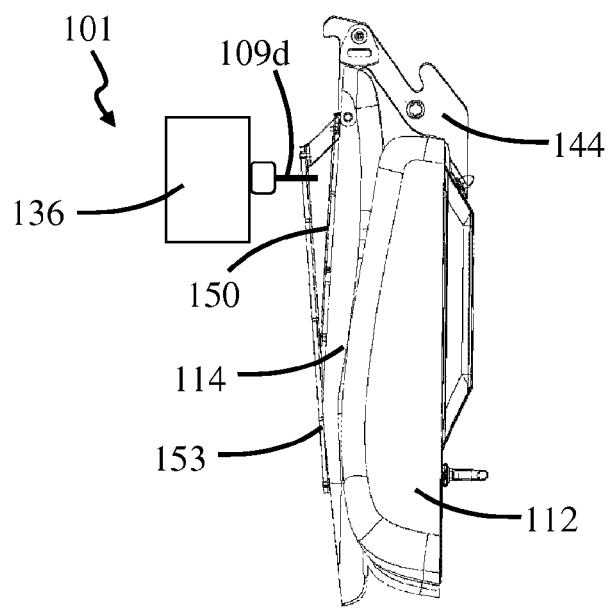

In some embodiments, the safety chair includes a bar carried by the seat frame. The bar extends away from the seat frame so that an opening is formed between the bar and seat frame. In some embodiments, method 255 includes a step of positioning the seat pan cushion and moveable seat back cushion so that they are carried by the bar. An example of one such bar is discussed in more detail above with FIGS. 5g and 5h.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A chair, comprising:
   a chair stand;
   a chair base carried by the chair stand;
   a seat frame extending upwardly from the chair base, the seat frame being repeatably rotatable relative to the chair stand; and
   an infant chair repeatably moveable between stowed and deployed positions with the chair base; and
   a child chair repeatably moveable between stowed and deployed positions with the seat frame.

2. The chair of claim 1, wherein the infant chair is repeatably moveable between the stowed and deployed positions with the chair base when the chair base is in a predetermined position.

3. The chair of claim 1, wherein the infant chair is restricted from moving between the stowed and deployed positions in response to the chair base not being in a predetermined position.

4. The chair of claim 1, wherein the infant chair moves through an opening of the seat frame when moving between the stowed and deployed positions.

5. The chair of claim 1, wherein the child chair is repeatably rotatable with the seat frame.

6. The chair of claim 1, wherein the child chair moves through an opening of the seat frame when moving between the stowed and deployed positions.

7. A chair, comprising:
   a chair stand;
   a chair base carried by the chair stand;

a seat frame with an upwardly extending portion, the seat frame being repeatably rotatable relative to the chair stand; and a child chair repeatably moveable between stowed and deployed positions with the seat frame; and an infant chair repeatably moveable between stowed and deployed positions.

8. The chair of claim 7, wherein the child chair moves through an opening of the seat frame when moving between the stowed and deployed positions.

9. The chair of claim 7, further including a flip bracket which rotatably couples the child chair with the seat frame.

10. The chair of claim 7, wherein the infant chair is repeatably moveable between the stowed and deployed positions when the chair base is directed in a predetermined direction.

11. The chair of claim 10, wherein the infant chair is restricted from moving between the stowed and deployed positions in response to the chair base not being directed in the predetermined direction.

12. The chair of claim 7, wherein the infant chair moves through an opening of the seat frame when moving between the stowed and deployed positions.

13. A chair, comprising:
a chair stand;
a chair base carried by the chair stand;
a seat frame extending upwardly from the chair base, the seat frame being repeatably rotatable relative to the chair stand;
a seat pan cushion and moveable seat back cushion rotatably coupled together;
a flip bracket which rotatably couples the seat pan cushion and moveable seat back cushion together;
a child chair rotatably coupled with the flip bracket;
an interlock assembly; and
an infant chair repeatably moveable between stowed and deployed positions;
wherein the interlock assembly restricts and allows the ability of the infant chair to move between the stowed and deployed positions.

14. The chair of claim 13, wherein the interlock assembly restricts the ability of the chair base to rotate in response to the infant chair being in the deployed position.

15. The chair of claim 13, wherein the interlock assembly allows the infant chair to move between the stowed and deployed positions when the chair base is in a predetermined position.

16. The chair of claim 13, wherein the seat pan cushion and seat back cushion are repeatably removeable from the seat frame.

* * * * *